US010387787B1

(12) United States Patent
Cessna et al.

(10) Patent No.: US 10,387,787 B1
(45) Date of Patent: Aug. 20, 2019

(54) METHOD AND SYSTEM FOR PROVIDING PERSONALIZED USER EXPERIENCES TO SOFTWARE SYSTEM USERS

(71) Applicant: Intuit Inc., Mountain View, CA (US)

(72) Inventors: Joseph Cessna, San Diego, CA (US); Massimo Mascaro, San Diego, CA (US); Joel R. Minton, La Jolla, CA (US)

(73) Assignee: Intuit Inc., Mountain View, CA (US)

( * ) Notice: Subject to any disclaimer, the term of this patent is extended or adjusted under 35 U.S.C. 154(b) by 785 days.

(21) Appl. No.: 14/925,531

(22) Filed: Oct. 28, 2015

(51) Int. Cl.

| | |
|---|---|
| ***G06Q 40/00*** | (2012.01) |
| ***G06N 5/02*** | (2006.01) |
| ***G06N 7/00*** | (2006.01) |

(52) U.S. Cl.
CPC .............. *G06N 7/005* (2013.01); *G06N 5/02* (2013.01); *G06Q 40/10* (2013.01); *G06Q 40/123* (2013.12)

(58) Field of Classification Search
CPC .................................................... G06Q 40/123
See application file for complete search history.

(56) References Cited

U.S. PATENT DOCUMENTS

| | | | |
|---|---|---|---|
| 6,922,488 B2 | 7/2005 | Mastrianni et al. | |
| 6,973,418 B1 | 12/2005 | Kirshenbaum | |
| 7,788,137 B1 | 8/2010 | Tifford | |
| 7,797,166 B1 | 9/2010 | Bradley et al. | |
| 8,090,794 B1 | 1/2012 | Kilat et al. | |
| 8,099,309 B1 * | 1/2012 | Bober | G06Q 10/063 705/7.11 |
| 8,190,499 B1 | 5/2012 | McVickar | |
| 8,407,113 B1 | 3/2013 | Eftekhari et al. | |
| 8,490,018 B2 | 7/2013 | Carter et al. | |
| 8,768,313 B2 | 7/2014 | Rodriguez | |
| 8,806,444 B1 | 8/2014 | Podgorny et al. | |
| 8,909,568 B1 | 12/2014 | Mann et al. | |
| 9,355,650 B2 | 5/2016 | Dimitriadis et al. | |

(Continued)

FOREIGN PATENT DOCUMENTS

WO WO 2016/039779 3/2016

OTHER PUBLICATIONS

Agrawal, Shipra, and Navin Goyal. "Thompson sampling for contextual bandits with linear payoffs." International Conference on Machine Learning. 2013.*

(Continued)

*Primary Examiner* — Li B. Zhen
*Assistant Examiner* — Markus Antonio Vasquez
(74) *Attorney, Agent, or Firm* — Hawley Troxell Ennis & Hawley LLP; Philip McKay

(57) ABSTRACT

A method and system adaptively improves potential customer conversion rates, revenue metrics, and/or other target metrics by providing effective user experience options, from a variety of different user experience options, to some users while concurrently testing user responses to other user experience options, according to one embodiment. The method and system selects the user experience options by applying user characteristics data to an analytics model, according to one embodiment. The method and system analyzes user responses to the user experience options to update the analytics model, and to dynamically adapt the personalization of the user experience options, at least partially based on feedback from users, according to one embodiment.

7 Claims, 9 Drawing Sheets

900

902 RECEIVING, WITH ONE OR MORE PROCESSORS, USER CHARACTERISTICS DATA FOR A CURRENT USER, THE USER CHARACTERISTICS DATA FOR THE CURRENT USER REPRESENTING USER CHARACTERISTICS FOR THE CURRENT USER

904 MAINTAINING A DATA STRUCTURE OF USER EXPERIENCE OPTIONS DATA REPRESENTING USER EXPERIENCE OPTIONS THAT ARE AVAILABLE FOR APPLICATION TO A USER SESSION OF THE CURRENT USER, WITHIN A SOFTWARE SYSTEM

906 STORING THE USER CHARACTERISTICS DATA AND THE USER EXPERIENCE OPTIONS DATA IN SECTIONS OF MEMORY THAT ARE ACCESSIBLE BY THE ONE OR MORE PROCESSORS

908 APPLYING, WITH THE ONE OR MORE PROCESSORS, THE USER EXPERIENCE OPTIONS DATA AND THE USER CHARACTERISTICS DATA FOR THE CURRENT USER TO A USER EXPERIENCE ANALYTICS MODEL TO PROBABILISTICALLY WEIGHT SELECTION OF AT LEAST SOME OF THE USER EXPERIENCE OPTIONS WITH DISTRIBUTION FREQUENCY RATES, TO ENABLE A PSEUDO-RANDOM DETERMINATION OF WHICH OF THE USER EXPERIENCE OPTIONS TO APPLY TO A PERSONALIZED USER EXPERIENCE IN THE USER SESSION OF THE CURRENT USER IN THE SOFTWARE SYSTEM, TO INCREASE A LIKELIHOOD OF CAUSING THE CURRENT USER TO COMPLETE A PREDETERMINED TASK DURING THE USER SESSION

910 GENERATING WEIGHTED PSEUDO-RANDOM NUMBER DATA AT LEAST PARTIALLY BASED ON THE DISTRIBUTION FREQUENCY RATES FOR EACH OF THE USER EXPERIENCE OPTIONS, THE WEIGHTED PSEUDO-RANDOM NUMBER DATA REPRESENTING A WEIGHTED PSEUDO-RANDOM NUMBER THAT CORRESPONDS WITH AT LEAST SOME OF THE USER EXPERIENCE OPTIONS

912 IDENTIFYING SELECTED ONES OF THE USER EXPERIENCE OPTIONS FOR APPLICATION TO THE USER SESSION FOR THE CURRENT USER AT LEAST PARTIALLY BASED ON THE WEIGHTED PSEUDO-RANDOM NUMBER DATA REPRESENTING THE WEIGHTED PSEUDO-RANDOM NUMBER THAT CORRESPONDS WITH THE AT LEAST SOME OF THE USER EXPERIENCE OPTIONS

914 INTEGRATING, WITH THE ONE OR MORE PROCESSORS, SELECTED ONES OF THE USER EXPERIENCE OPTIONS DATA THAT CORRESPOND WITH THE SELECTED ONES OF THE USER EXPERIENCE OPTIONS INTO ONE OR MORE USER EXPERIENCE DISPLAYS FOR THE USER SESSION OF THE CURRENT USER, WITHIN THE SOFTWARE SYSTEM

916 DELIVERING THE ONE OR MORE USER EXPERIENCE DISPLAYS, WITH THE SELECTED ONES OF THE USER EXPERIENCE OPTIONS TO THE CURRENT USER DURING THE USER SESSION FOR THE CURRENT USER, TO INCREASE A LIKELIHOOD OF CAUSING THE CURRENT USER TO COMPLETE THE PREDETERMINED TASK DURING THE USER SESSION, BY PERSONALIZING PRESENTATION OF THE SELECTED ONES OF THE USER EXPERIENCE OPTIONS TO THE CURRENT USER

(56) References Cited

U.S. PATENT DOCUMENTS 9,378,065 B2 6/2016 Shear et al.
9,444,824 B1 9/2016 Balazs et al.
9,648,171 B1 5/2017 Eftekhari et al.
9,891,792 B1 2/2018 Morin et al.
9,983,859 B2 5/2018 Mascaro et al.
9,990,544 B1 6/2018 Uribe et al.
10,013,721 B1 7/2018 Laaser et al.
2002/0152457 A1 10/2002 Jahnke
2003/0144868 A1* 7/2003 MacIntyre ........ G06F 17/30536 705/7.38
2006/0143093 A1* 6/2006 Brandt .................. G06F 3/0482 705/26.1
2006/0155632 A1 7/2006 Cherkas et al.
2006/0294084 A1 12/2006 Patel et al.
2008/0071703 A1 3/2008 Evans
2008/0127127 A1 5/2008 Chitgupakar et al.
2008/0147494 A1 6/2008 Larson
2009/0106178 A1 4/2009 Chu
2009/0313086 A1 12/2009 Lee et al.
2011/0264569 A1 10/2011 Houseworth et al.
2011/0288868 A1 11/2011 Lloyd et al.
2012/0109792 A1* 5/2012 Eftekhari ................ G06F 21/31 705/31
2013/0198047 A1 8/2013 Houseworth et al.
2013/0268468 A1 10/2013 Vijayaraghavan et al.
2013/0282539 A1 10/2013 Murray
2014/0067518 A1 3/2014 McGovern
2014/0068600 A1 3/2014 Ashok et al.
2014/0075336 A1* 3/2014 Curtis ................... G06F 3/0481 715/753
2014/0122381 A1 5/2014 Nowozin
2014/0201045 A1 7/2014 Pai et al.
2014/0359261 A1 12/2014 Collins et al.
2015/0227962 A1 8/2015 Wical et al.
2016/0012350 A1 1/2016 Narayanan et al.
2016/0098804 A1 4/2016 Mascaro et al.
2016/0103667 A1 4/2016 Chen et al.
2016/0180470 A1 6/2016 Mascaro et al.
2016/0217534 A1 7/2016 Goldman et al.
2016/0247239 A1 8/2016 Houseworth et al.
2016/0267397 A1 9/2016 Carlsson
2016/0350870 A1 12/2016 Morin et al.
2017/0090893 A1 3/2017 Aditya et al.
2017/0178199 A1 6/2017 Cessna et al.
2017/0186097 A1 6/2017 Mascaro et al.
2017/0200087 A1 7/2017 Mascaro et al.
2017/0300933 A1 10/2017 Mascaro et al.
2017/0308960 A1 10/2017 Mascaro et al.
2017/0315791 A1 11/2017 Mascaro et al.

OTHER PUBLICATIONS

Rokach, Lior, and Oded Maimon. "Top-down induction of decision trees classifiers-a survey." IEEE Transactions on Systems, Man, and Cybernetics, Part C (Applications and Reviews) 35.4 (2005): 476-487.*

Irsoy, Ozan, Olcay Taner Yildiz, and Ethem Alpaydin. "Budding trees." Pattern Recognition (ICPR), 2014 22nd International Conference on. IEEE, 2014.*

Hoeting, Jennifer A., et al. "Bayesian model averaging: a tutorial." Statistical science (1999): 382-401.*

Araujo et al., "Ensemble Forecasting of Species Distributions," ScienceDirect Trends in Ecology and Evolution, vol. 22, No. 1, Sep. 29, 2006, pp. 42-47.

* cited by examiner

800

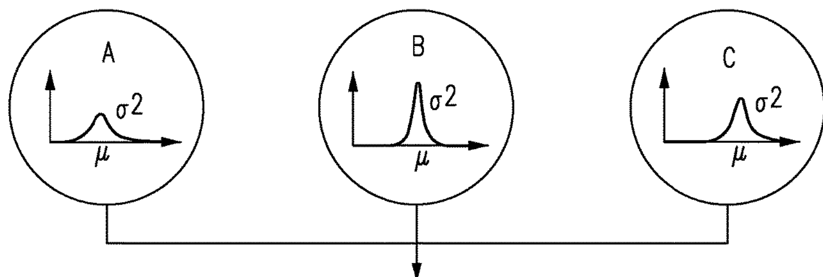

Compute the effective performance of the input estimates blended via Thompson Sampling.

Based on these estimates, compute the probability that the true performance of each experience is better than the other alternatives ($f_i$ is the pdf and $F_i$ is the cdf for the $i^{th}$ experience estimate).

$$p_i^L = p(\bigcap_{j \neq i} \mu_i > \mu_j) = \int f_i(x) \prod_{j \neq i} F_j(x)\,dx$$

e.g.
P(A > B & A > C) = 0.1
P(B > A & B > C) = 0.3
P(C > A & C > B) = 0.6

For the segment, define the allocation probability (the probability of assigning a particular experience to a user in this segment) to be equal to the previously computed probability of that experience being the best. That is, if the probability that C is the best experience is 0.6, then we will allocate 60% of the traffic in this segment to experience C. Given this allocation strategy, compute the effective performance of the entire segment as a weighted combination of each experience.

0.1 0.3 0.6

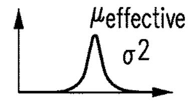

$\mu_{effective} = 0.1\,\mu_A + 0.3\,\mu_B + 0.6\,\mu_C$ $\mu$effective σ2

Assignment Prob
P(A) = 0.1
P(B) = 0.3
P(C) = 0.6

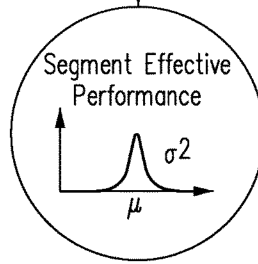

FIG. 8

METHOD AND SYSTEM FOR PROVIDING PERSONALIZED USER EXPERIENCES TO SOFTWARE SYSTEM USERS

BACKGROUND

Federal and State Tax law has become so complex that it is now estimated that each year Americans alone use over 6 billion person hours, and spend nearly 4 billion dollars, in an effort to comply with Federal and State Tax statutes. Given this level of complexity and cost, it is not surprising that more and more taxpayers find it necessary to obtain help, in one form or another, to prepare their taxes. Tax return preparation systems, such as tax return preparation software programs and applications, represent a potentially flexible, highly accessible, and affordable source of tax preparation assistance. However, traditional tax return preparation systems are, by design, fairly generic in nature and often lack the malleability to meet the specific needs of a given user.

For instance, traditional tax return preparation systems often present a fixed, e.g., predetermined and pre-packaged, structure or sequence of questions to all users as part of the tax return preparation interview process. This is largely due to the fact that the traditional tax return preparation system analytics use a sequence of interview questions, and/or other user experiences, that are static features and that are typically hard-coded elements of the tax return preparation system and do not lend themselves to effective or efficient modification. As a result, the user experience, and any analysis associated with the interview process and user experience, is a largely inflexible component of a given version of the tax return preparation system. Consequently, the interview processes and/or the user experience of traditional tax return preparation systems can only be modified through a redeployment of the tax return preparation system itself. Therefore, there is little or no opportunity for any analytics associated with the interview process, and/or user experience, to evolve to meet a changing situation or the particular needs of a given taxpayer, even as more information about that taxpayer, and their particular circumstances, is obtained.

As an example, using traditional tax return preparation systems, the sequence of questions, and the other user experience elements, presented to a user are pre-determined based on a generic user model that is, in fact and by design, not accurately representative of any "real world" user. Consequently, irrelevant, and often confusing, interview questions are virtually always presented to any given real world user. It is therefore not surprising that many users, if not all users, of these traditional tax return preparation systems experience, at best, an impersonal, unnecessarily long, confusing, and complicated, interview process and user experience. Clearly, this is not the type of impression that results in happy, loyal, repeat customers.

Even worse is the fact that, in many cases, the hard-coded and static analysis features associated with traditional tax return preparation systems, and the resulting presentation of irrelevant questioning and user experiences, leads potential users of traditional tax return preparation systems, i.e., potential customers, to believe that the tax return preparation system is not applicable to them, and perhaps is unable to meet their specific needs. In other cases, the users simply become frustrated with these irrelevant lines of questioning and other user experience elements. Many of these potential users and customers then simply abandon the process and the tax return preparation systems completely, i.e., never become paying customers. Furthermore, the potential customers do not become proponents for the tax return preparation systems (e.g., by promoting the product to their friends and family), and may instead become opponents to the tax return preparation systems (e.g., by recommending against the use of the systems). Clearly, this is an undesirable result for both the potential user of the tax return preparation system and the provider of the tax return preparation system.

Some of the shortcomings associated with traditional software systems, e.g., tax return preparation systems, is a result of insufficient, inadequate, and/or antiquated testing techniques. Even if a service provider wanted to adjust or customize the user experience flow, it is difficult to quickly and efficiently ascertain user preferences and the effect on users of providing different versions of a software system to groups of users.

What is needed is a method and system for providing personalized user experiences to software systems users (e.g., tax return preparation systems, personal finance management systems, business finance management systems, etc.), according to various embodiments.

SUMMARY

Embodiments of the present disclosure address some of the shortcomings associated with traditional tax return preparation systems and other software systems by providing personalized user experiences in a software system. Providing personalized user experiences includes displaying/delivering different user experience options to different groups of users. The software system delivers a first user experience option to one group (e.g., a control group), and provides a second user experience option to another group (e.g., a test group). The first user experience is more likely to help people have a good experience, but the software system provides both options to users to confirm/test that the first user experience option is actually better than the second user experience option. The disclosed software system selects user experience options by applying user characteristics data (e.g., a user's age, income amount, geographical location, etc.) to a user experience analytics model, according to one embodiment. The user experience analytics model determines rates that are used to deliver the user experience options to the groups (e.g., the control and test groups). This user experience option distribution technique enables the software system to help users to have a good experience with the software system, while testing whether another user experience option would be better to the users. The software system analyzes user responses to the user experience options to update the user experience analytics model and to dynamically adapt the personalization of the user experience options, at least partially based on feedback from users, according to one embodiment.

Embodiments of the disclosed software system provides superior testing results over traditional A/B testing, while seamlessly integrating feedback from the A/B testing into the software system. Traditional A/B testing is inefficient. For example, traditional A/B testing allocates control conditions to 50% of a set of users as a control group and allocates experimental conditions to 50% of the set of users as an experimental group, without regard to the likelihood of satisfactory performance of the control conditions over the test conditions or vice versa. The test conditions are typically set, until a critical confidence, e.g., 95% confidence, is reached. By contrast, the disclosed system dynamically allocates and re-allocates control conditions and test conditions concurrently, to enable the software system to both test new user experience options while providing users with personalized user experiences that they are probabilistically likely to respond well to. As a result, more users of the software system are likely to be satisfied with the software system and are more likely to complete a predetermined/desired action (e.g., completing questions, visiting a sequence of web pages, file a tax return, etc.) because the users receive relevant and/or preferred user experience options sooner than the same users would with the implementation of traditional A/B testing techniques. The improvements in customer satisfaction and the increases in customers completing predetermined actions in the software system results in increased conversions of potential customers to paying customers, which translates to increased revenue for service providers, according to one embodiment.

By providing personalized user experiences in software systems, such as tax return preparation systems, implementation of embodiments of the present disclosure allows for significant improvement to the fields of user experience, electronic tax return preparation, data collection, and data processing, according to one embodiment. As one illustrative example, by adaptively distributing user experience options to users based on user characteristics and based on distributive frequency rates, embodiments of the present disclosure allows for progressing a user through software system user flows and/or tax return preparation sessions with fewer processing cycles and less communications bandwidth because the user is less likely to prematurely terminate his/her user session prior to completing a particular activity (e.g., filing a tax return). This reduces processing cycles and communications bandwidth because the user, after termination of his session, does not then go to a competing tax return preparation system and/or software system to redundantly perform the same tasks. In other words, improving customer satisfaction, by personalizing the user experiences, reduces global energy consumption by reducing redundant efforts and inefficiencies associated therewith. As a result, embodiments of the present disclosure allow for improved processor performance, more efficient use of memory access and data storage capabilities, reduced communication channel bandwidth utilization, and therefore faster communications connections.

In addition to improving overall computing performance, by dynamically and adaptively providing personalized user experiences in software systems, implementation of embodiments of the present disclosure represent a significant improvement to the field of automated user experiences and, in particular, efficient use of human and non-human resources. As one illustrative example, by increasing personal preferences for user experience options and by reducing presentation of non-preferred/less-effective user experience options, the user can more easily comprehend and interact with digital user experience displays and computing environments, reducing the overall time invested by the user to the tax return preparation or other software system-related tasks. Additionally, selectively presenting user experience options to users, based on their user characteristics, improves and/or increases the likelihood that a potential customer will be converted into a paying customer because the potential customer receives confirmation that the software system appears to understand the particular user's needs and preferences, according to one embodiment. Consequently, using embodiments of the present disclosure, the user experience is less burdensome, less time consuming and allows the user to dedicate more of his or her time to other activities or endeavors, while having confidence that the tax return preparation system and/or software system is adequately addressing the needs of the user.

BRIEF DESCRIPTION OF THE DRAWINGS

FIG. 8 is a flow diagram of an example of a process for computing the effective performance of input estimates blended by Thompson Sampling, according to one embodiment

DETAILED DESCRIPTION

Figure 1A:
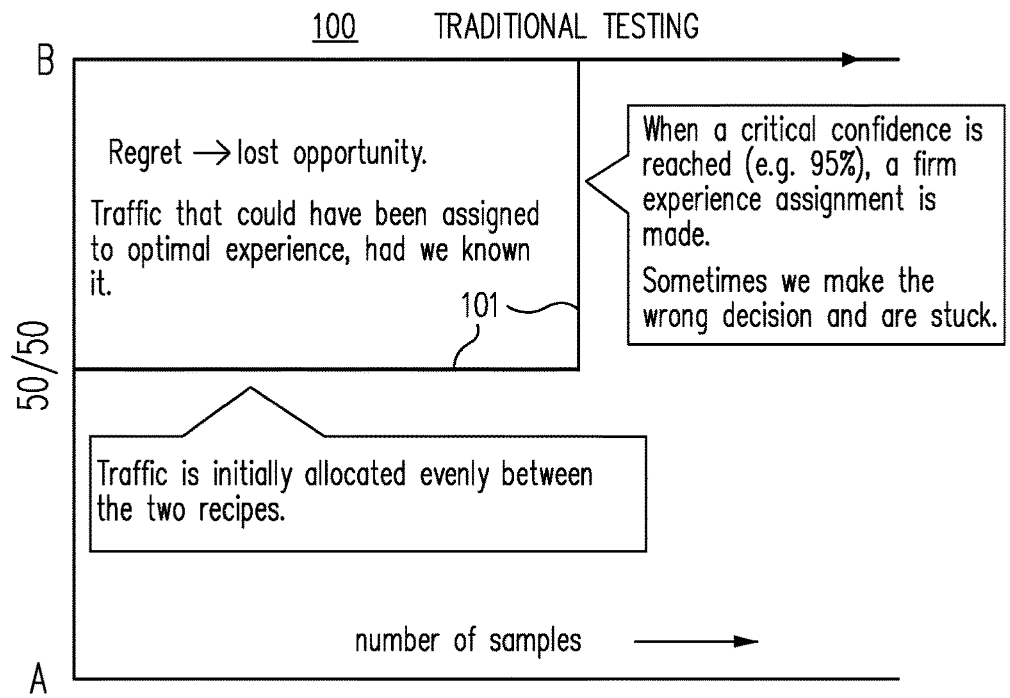
FIGS. 1A and 1B are graph diagrams of A/B testing techniques, in accordance with one embodiment.

Embodiments will now be discussed with reference to the accompanying FIG.s, which depict one or more exemplary embodiments.

Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein describe systems and processes suitable for adaptively providing personalized user experiences in a software system, such as a tax return preparation system, according to various embodiments.

Introductory System

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of software systems include, but are not limited to the following: TurboTax™, TurboTax Online™, QuickBooks™, QuickBooks Online™, Mint™, Mint Online™, all of which are available from Intuit™, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets within one or more cloud or traditional computing environments.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience display" includes not only data entry and question submission user interfaces, but also other user experience features provided or displayed to the user such as, but not limited to the following: data entry fields; question quality indicators; images; backgrounds; avatars; highlighting mechanisms; icons; and any other features that individually, or in combination, create a user experience, as discussed herein, and/or as known in the art at the time of filing, and/or as developed after the time of filing.

As used herein, the term "user experience" includes not only the user session, interview process, interview process questioning, and/or interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the disclosed methods and systems described herein, and/or a person and/or entity that interfaces with, and/or to whom information is provided by, the disclosed methods and systems described herein, and/or a legal guardian of person and/or entity that interfaces with, and/or to whom information is provided by, the disclosed methods and systems described herein, and/or an authorized agent of any party and/or person and/or entity that interfaces with, and/or to whom information is provided by, the disclosed methods and systems described herein. For instance, in various embodiments, a user can be, but is not limited to, a person, a commercial entity, an application, a service, and/or a computing system.

As used herein, the term "analytics model" or "analytical model" denotes one or more individual or combined algorithms or sets of equations that describe, determine, and/or predict characteristics of or the performance of a datum, a data set, multiple data sets, a computing system, and/or multiple computing systems. Analytics models or analytical models represent collections of measured and/or calculated behaviors of attributes, elements, or characteristics of data and/or computing systems.

As used herein, the terms "interview" and "interview process" include, but are not limited to, an electronic, software-based, and/or automated delivery of multiple questions to a user and an electronic, software-based, and/or automated receipt of responses from the user to the questions, to progress a user through one or more groups or topics of questions, according to various embodiments.

As used herein, the term "decision tree" denotes a hierarchical tree structure, with a root node, parent nodes, and children nodes. The parent nodes are connected to children nodes through edges, and edge logic between parent nodes and children nodes performs a gating function between parent nodes and children nodes to permit or block the flow of a path from a parent node to a child node. As used herein, a node is associated with a node action that a model or process performs on a data sample or on a set of data samples.

As used herein, the term "segment" denotes a portion, section, or subset of a set of users (i.e., a user set). A segment can include an entire set of users or a portion of a set of users. As used herein a segment or sub-segment denotes a portion, section, or subset of users who have one or more user characteristics (as defined below) in common.

As used herein, the term distribution frequency rate denotes decimal numbers, fractions, and/or percentages that represent an average quantity of traffic for a segment of users to which one or more user experience options are delivered, with the software system. In alternative language, the term distribution frequency rate denotes decimal numbers, fractions, and/or percentages that represent an average quantity of traffic for a segment of users that is directed to one or more user experience options within a software system.

Hardware Architecture

Disclosed herein is a production environment for providing personalized user experiences in a software system, to provide personalized user experience options to one segment of users while concurrently testing the effectiveness of other user experience options on another segment of users, according to one embodiment. The disclosed software system selects user experience options by applying user characteristics data to a user experience analytics model, according to one embodiment. The user experience analytics model determines rates by which to distribute user experience options to segments of users to concurrently distribute and test user experience options among segments of users, according to one embodiment. The software system analyzes user responses to the user experience options to update the user experience analytics model and to dynamically adapt the personalization of the user experience options, at least partially based on feedback from users, according to one embodiment.

Embodiments of the disclosed software system provides superior testing results over traditional A/B testing, while seamlessly integrating feedback from the A/B testing into the software system. Traditional A/B testing is inefficient. For example, traditional A/B testing allocates control conditions to 50% of a set of users as a control group and allocates experimental conditions to 50% of the set of users as an experimental group, without regard to the likelihood of satisfactory performance of the control conditions over the test conditions or vice versa. The test conditions are typically set, until a critical confidence, e.g., 95% confidence, is reached. By contrast, the disclosed system dynamically allocates and re-allocates control conditions and test conditions concurrently, to enable the software system to both test new user experience options while providing users with personalized user experiences that they are probabilistically likely to respond well to. As a result, more users of the software system are likely to be satisfied with the software system and are more likely to complete a predetermined/desired action (e.g., completing questions, visiting a sequence of web pages, file a tax return, etc.) because the users receive relevant and/or preferred user experience options sooner than the same users would with the implementation of traditional A/B testing techniques. The improvements in customer satisfaction and the increases in customers completing predetermined actions in the software system results in increased conversions of potential customers to paying customers, which translates to increased revenue for service providers, according to one embodiment.

Figure 1B:
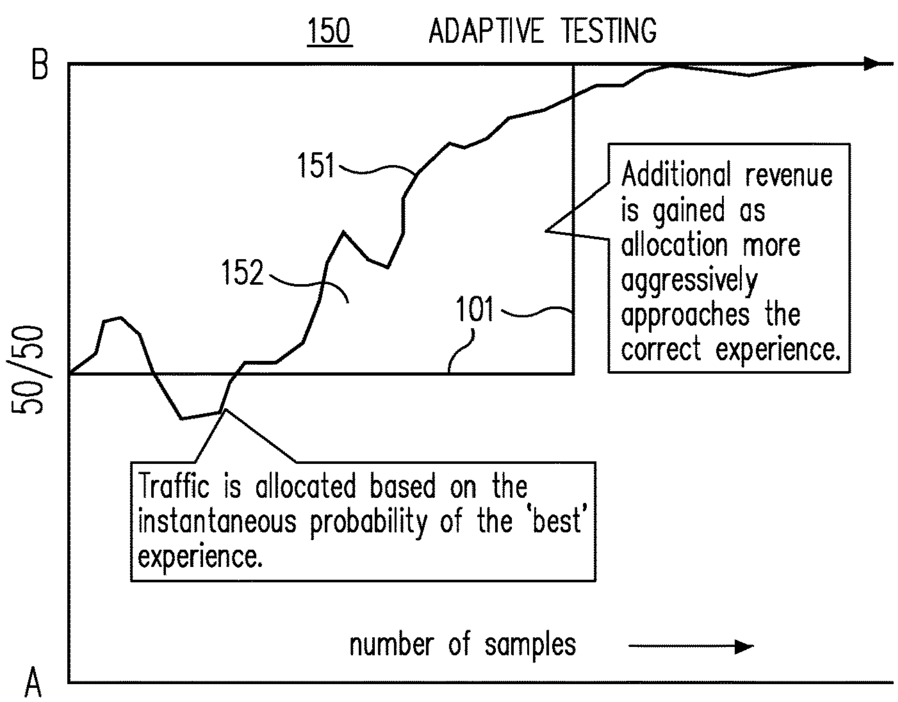

FIGS. 1A and 1B are graphical representations of some of the advantages of adaptive A/B testing over traditional A/B testing, according to one embodiment. FIG. 1A is an example of a graph 100 that illustrates delivery of a condition A to 50% of a user set and delivery of a condition B to 50% of a user set for a number of samples (x-axis), using traditional A/B testing techniques. Conditions A and B are equally distributed to the user sets until a critical confidence level is reached, e.g., 95%. After the critical confidence level is reached, traditional testing techniques switch to delivering the more successful of the conditions to 100% of the user set. In the graph 100, the test switches at a number of samples, represented by graph line 101, that were tested until a confidence level (e.g., 95%) was reached. Everything above and to the left of the graph line 101 represents lost opportunity to provide condition B to the user set rather than condition A (which has ultimately been deemed inferior).

FIG. 1B shows a graph 150 that illustrates an adaptive delivery of condition A and condition B to the user set while determining which condition is superior to the other, according to one embodiment. The graph 150 includes a graph line 151 that represents a percentage of condition B that is allocated to the user set, according to one embodiment. The area 152 that is under the graph line 151 illustrates that more users of the user set receive condition B sooner by using adaptive A/B testing instead of the traditional A/B testing illustrated by FIG. 1A, according to one embodiment. Importantly, providing condition B sooner equates to providing more users with user experiences that are in accordance with user preferences and that are more likely to assist users in completing or accomplishing a particular activity (e.g., providing personal information, paying for a service, signing up as a service provider customer, staying logged in to a user session, complete filing a tax return, etc.), according to one embodiment. Thus, implementation of adaptive testing by providing personalized user experiences in a software system, as disclosed herein, translates to increases in quantities of satisfied customers and improved revenue for the service provider of the software system, according to one embodiment. The systems and methods of FIGS. 2-9 disclose various embodiments that leverage the advantages of adaptive testing as described with respect to FIGS. 1A and 1B, according to one embodiment.

Figure 2:
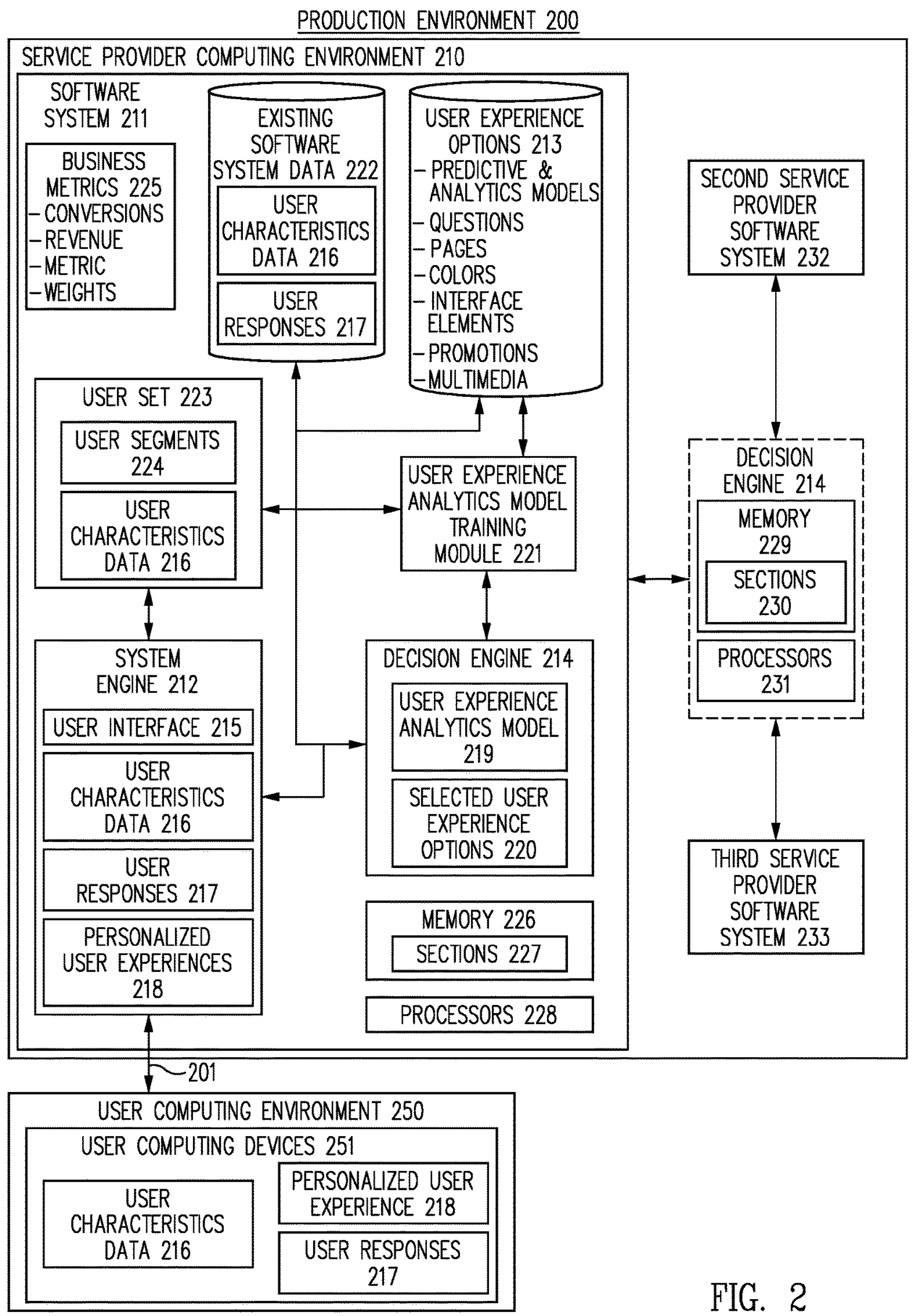
FIG. 2 is a block diagram of an example architecture for adaptively providing personalized user experiences, in accordance with one embodiment.

FIG. 2 illustrates an example embodiment of a production environment 200 for adaptively providing personalized user experiences in a software system, e.g., a tax return preparation system. The production environment 200 includes a service provider computing environment 210 and a user computing environment 250 to deliver personalized user experiences to users of a software system, to cause the users to perform one or more particular actions (e.g., answer a sequence of questions, continue use of the software system, file a tax return, etc.), according to one embodiment. The computing environments 210 and 250 are communicatively coupled to each other with a communication channel 201, according to one embodiment.

The service provider computing environment 210 represents one or more computing systems such as, but not limited to, a server, a computing cabinet, and/or distribution center that is configured to receive, execute, and host one or more applications for access by one or more users, e.g., clients of the service provider, according to one embodiment. The service provider computing environment 210 represents a traditional data center computing environment, a virtual asset computing environment (e.g., a cloud computing environment), or a hybrid between a traditional data center computing environment and a virtual asset computing environment, to host one or more software systems, according to one embodiment. The one or more software systems can include, but are not limited to tax return preparation systems, other financial management systems, and applications that support the tax return preparation systems and/or the other financial management systems, according to one embodiment. The service provider computing environment 210 includes a software system 211 that adaptively provides personalized user experiences by directing users to user experience options in accordance with distribution frequency rates, at least partially based on user characteristics for the users, according to one embodiment. By adaptively providing personalized user experiences, the software system 211 improves user satisfaction, increases service provider revenue, facilitates user interactions with user interfaces, determines user preferences for user experience options, while concurrently, automatically, and seamlessly increasing user traffic to well-performing user experience options in the software system 211, according to one embodiment. The software system 211 includes various components, databases, engines, modules, and data to support adaptively providing personalized user experiences to users of the software system 211, according to one embodiment. The software system 211 includes a system engine 212, user experience options 213, and a decision engine 214, according to one embodiment.

The system engine 212 is configured to communicate information between users and the software system 211, according to one embodiment. The system engine 212 executes/hosts a user interface 215, according to one embodiment. The system engine 212 executes/hosts the user interface 215 to receive user characteristics data 216 and to receive user responses 217 from users, in response to personalized user experiences 218 provided to the users by the software system 211, according to one embodiment. The user interface 215 includes one or more user experience elements and graphical user interface tools, such as, but not limited to, buttons, slides, dialog boxes, text boxes, drop-down menus, banners, tabs, directory trees, links, audio content, video content, and/or other multimedia content for communicating information to the user and for receiving the information from users, according to one embodiment.

The system engine 212 and/or the software system 211 communicates with the user through the user computing environment 250, according to one embodiment. The user computing environment 250 includes user computing devices 251 that are representative of computing devices or computing systems used by users to access, view, operate, and/or otherwise interact with the software system 211, according to one embodiment. The term "users" and "user computing devices" are used interchangeably to represent the users of the software system 211, according to one embodiment. Through the user computing devices 251, users provide the user characteristics data 216 and provide the user responses 217 to the software system 211, in response to receipt of the personalized user experiences 218, according to one embodiment.

The user characteristics data 216 represents user characteristics for users of the software system 211, according to one embodiment. The user characteristics data 216 can include information from existing software system data 222, such as one or more previous years' tax return data for a particular user and previous user interactions with the software system 211. The user characteristics data 216 is stored in a data store, a database, and/or a data structure, according to one embodiment. The user characteristics data 216 also includes information that the software system 211 gathers directly from one or more external sources such as, but not limited to, a payroll management company, state agencies, federal agencies, employers, military records, public records, private companies, and the like, according to one embodiment. Additional examples of the user characteristics (represented by the user characteristics data 216) include, but are not limited to, data indicating user computing system characteristics (e.g., browser type, applications used, device type, operating system, etc.), data indicating time-related information (hour of day, day of week, etc.), data indicating geographical information (latitude, longitude, designated market area region, etc.), data indicating external and independent marketing segments, data identifying an external referrer of the user (e.g., paid search, ad click, targeted email, etc.), data indicating a number of visits made to a service provider website, a user's name, a Social Security number, government identification, a driver's license number, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system, or in the preparation of a user's tax return, according to various embodiments.

The system engine 212 provides personalized user experiences 218, by populating and/or using one or more user experience options 213 in the personalized user experience 218, according to one embodiment. The user experience options 213 include predictive and analytics models that can be used to determine relevant topics to present to the user; questions to present to user; sequences of topics to present to user; sequences of questions to present to user; and the like, according to one embodiment. The user experience options 213 also include, but are not limited to, questions, webpages, sequences of pages, colors, interface elements, positioning of interface elements within webpages, promotions that can be offered to users, audio files, video files, other multimedia, and the like, according to various embodiments.

Users of the software system 211 will have individual preferences, technical competency levels, levels of education, levels of comfort using digital technologies, and other distinctive or individual characteristics that increase the value of personalized user experiences of the software system 211 for the users. To improve the likelihood of satisfaction of the user with his experience with the software system 211, the system engine 212 selectively applies one or more of the user experience options 213 to the personalized user experiences 218 while facilitating interactions between the software system 211 and the users, according to one embodiment.

The software system 211 uses the decision engine 214 to identify which user experience options 213 to apply to the personalized user experiences 218, in order to facilitate or promote one or more particular user actions (e.g., such as completing a set of questions, continuing to use the software system 211, filing a tax return with the software system 211, etc.), according to one embodiment. The decision engine 214 is configured to receive the user characteristics data 216, receive the user experience options 213, and select one or more of the user experience options 213 for the system engine 212 to integrate into the personalized user experiences 218 for users of the software system 211, according to one embodiment.

The decision engine 214 applies the user characteristics data 216 and the user experience options 213 to a user experience analytics model 219, to determine which user experience options 213 to apply to users with particular user characteristics, according to one embodiment. The user experience analytics model 219 returns distribution frequency rates for user experience options 213, based on the user characteristics data 216, according to one embodiment. The distribution frequency rates define a frequency with which users having particular user characteristics are directed to particular user experience options, according to one embodiment. In one embodiment, users are directed to particular user experience options, for example, via a universal resource locator ("URL"). In one embodiment, selected user experience options are delivered to users by modifying the content of personalized user experiences 218. "Directing users to user experience options" is used interchangeably with "providing users with user experience options", according to one embodiment.

The decision engine 214 uses the distribution frequency rates from the user experience analytics model 219 to generate a weighted pseudo-random number that represents the one or more user experience options that are to be provided to a user based on the user's user characteristics data, according to one embodiment. Examples of distribution frequency rates include 0.2 for a first user experience option, 0.5 for a second user experience option, and 0.3 for a combination of one or more other user experience options, according to one embodiment. In practice, 0.2, 0.5, and 0.3 distribution frequency rates means that for a particular user characteristic, 2 out of 10 users receive the first user experience option, 5 out of 10 users receive the second user experience option, and 3 out of 10 users receive the combination of one or more other user experience options, according to one embodiment. The decision engine 214 uses the distribution frequency rates and the weighted pseudo-random number to identify selected user experience options 220, for delivery to the user, according to one embodiment.

While the user experience options 213 are described as experience elements/features that are added to the personalized user experiences 218, the selected user experience options 220 can also include the omission of one or more user experience options 213. For example, the user experience analytics model 219 can be configured to generate distribution frequency rates of 0.8 and 0.2 for determining whether or not to display large icons in the personalized user experiences 218, according to whether the age, income level, employment status, education level, or other user characteristic is above or below one or more thresholds that are set within the user experience analytics model 219, according to one embodiment. In other words, the output of the user experience analytics model 219 can be Boolean and can simply determine whether a user receives a user experience option or not, based on the user's user characteristics, according to one embodiment.

The software system 211 uses, executes, and/or operates a user experience analytics model training module 221 to train (e.g., initialize and update) the user experience analytics model 219, according to one embodiment. The user experience analytics model training module 221 retrieves user characteristics data 216 from the existing software system data 222 and retrieves user experience options 213 for use in training the user experience analytics model 219, according to one embodiment. The user experience analytics model training module 221 initializes and/or updates the user experience analytics model 219 using techniques that include, but are not limited to, regression, logistic regression, decision trees, artificial neural networks, support vector machines, linear regression, nearest neighbor methods, distance based methods, Naive Bayes, linear discriminant analysis, k-nearest neighbor algorithm, and/or another mathematical, statistical, logical, or relational algorithms to determine correlations and/or other relationships between the user characteristics data and the performance of user experience options on segments of users, according to one embodiment.

In one embodiment, the user experience analytics model training module 221 defines a user set 223 that is based on all or part of the users that have interacted with the software system 211 and/or for whom user characteristics data 216 has been gathered or received. The user experience analytics model training module 221 defines a number of user segments 224 around subsets of commonly held user characteristics. In other words, the user segments 224 are subsets of the user set 223, and each of the user segments 224 have one or more user characteristics in common, according to one embodiment.

The user experience analytics model training module 221 trains the user experience analytics model 219 by generating a decision tree, based on how particular user experience options 213 perform with particular user segments 224, according to one embodiment. The user experience analytics model training module 221 generates a decision tree as part of the analytics logic for the user experience analytics model 219, to facilitate generating distribution frequency rates. The processes 300, 500, 600, 700, and 800, of FIGS. 3, 5, 6, 7, and 8 respectively, disclose particular embodiments that may be used by the user experience analytics model training module 221 for initializing and/or updating the user experience analytics model 219, according to one embodiment.

The software system 211 adapts to user responses 217 received from users, to update the user experience analytics model 219, and to dynamically and adaptively improve the personalized user experiences 218, according to one embodiment. The software system 211 is configured to store/update user characteristics data 216 and user responses 217, as the existing software system data 222, during the operation of the software system 211. After a predetermined period of time, such as, but not limited to, an hour, a day, semi-weekly, weekly, biweekly, and the like, the user experience analytics model training module 221 retrieves the user experience options 213, the user characteristics data 216, the user responses 217, and the business metrics 225 to determine the performance of the user experience options 213 and to update the user experience analytics model 219, based on the performance of the user experience options 213, according to one embodiment. Particular embodiments for initializing and/or updating the user experience analytics model 219 are disclosed below in the processes 300, 500, 600, 700, and 800, and in the corresponding FIGS. 3, 5, 6, 7, and 8, respectively, according to one embodiment.

The business metrics 225 include, but are not limited to, the various metrics used by the software system 211 and/or the service provider of the software system 211 to evaluate the success, failures and/or the performance of the user experience options 213, according to one embodiment. The business metrics 225 include, but are not limited to, number of conversions of users from potential customers to paying customers, the percentage of conversions of potential customers to paying users, quantities of revenue, rates of revenue collected per user (e.g., average revenue collected per user), increases/decreases in revenue as compared to one or more previous years, months, weeks, days, and metric weights that are applied to conversions and revenues to establish a relative importance of conversions verses revenue generation. The business metrics 225 can also include records of other actions taken by users, such as, but not limited to, numbers of questions answered, duration of use of the software system 211, number of pages or user experience displays visited within a software system 211, use of customer support, and the like, according to one embodiment.

The software system 211 includes memory 226 that has one or more sections 227 allocated for the operation or support of the software system 211, according to one embodiment. For example, the memory 226 and/or the one or more sections 227 are allocated to the storing and/or processing of: user characteristics data 216, user responses 217, the user experience analytics model 219, the user experience analytics model training module 221, and the like, according to one embodiment. The software system 211 also includes one or more processors 228 configured to execute and/or support the operations of the software system 211, according to one embodiment.

In one embodiment, the decision engine 214 is integrated into the software system 211 to support operation of the software system 211. In one embodiment, the decision engine 214 is hosted in the service provider computing environment 210 and is allocated computing resources, e.g., memory 229 having sections 230, and one or more processors 231, that are different than some of the computing resources of the software system 211. The decision engine 214 is hosted in the service provider computing environment 210 in order to provide support for the software system 211, in addition to providing support for a second service provider software system 232 and/or a third service provider software system 233, according to one embodiment. Although a second service provider software system 232 and a third service provider software system 233 are illustrated and described herein, the decision engine 214 can be configured to operationally support fewer or more software systems, according to various embodiments.

The user experience analytics model training module 221 initializes and/or updates the user experience analytics model 219 from a backend or off-line system, rather than as an integrated online process, according to one embodiment. For example, rather than sharing memory and processor resources with the software system 211, the user experience analytics model training module 221 is allocated dedicated memory and processor resources to facilitate secure and more timely processing of user characteristics of new and existing software system data, and of user experience options for training the user experience analytics model 219. In another embodiment, the user experience analytics model training module 221 is integrated into the software system 211, as illustrated, and shares one or more hardware resources with the decision engine 214, within the service provider computing environment 210, according to one embodiment.

Process

Figure 3:
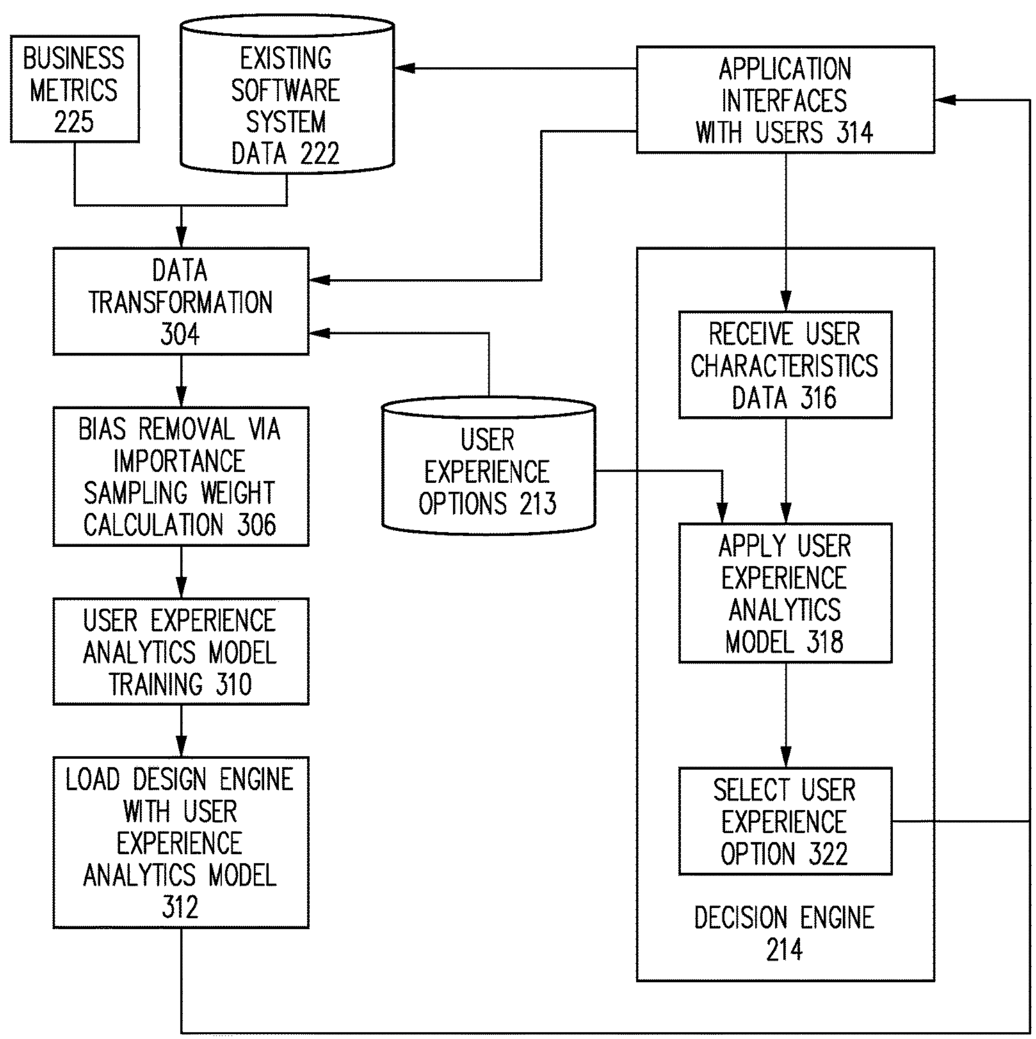
FIG. 3 is a flow diagram of an example of a process for training and updating a user experience analytics model, according to one embodiment.

FIG. 3 illustrates a process 300 for training (e.g., initializing and updating) the user experience analytics model 219, as described above, according to one embodiment.

Figure 4:
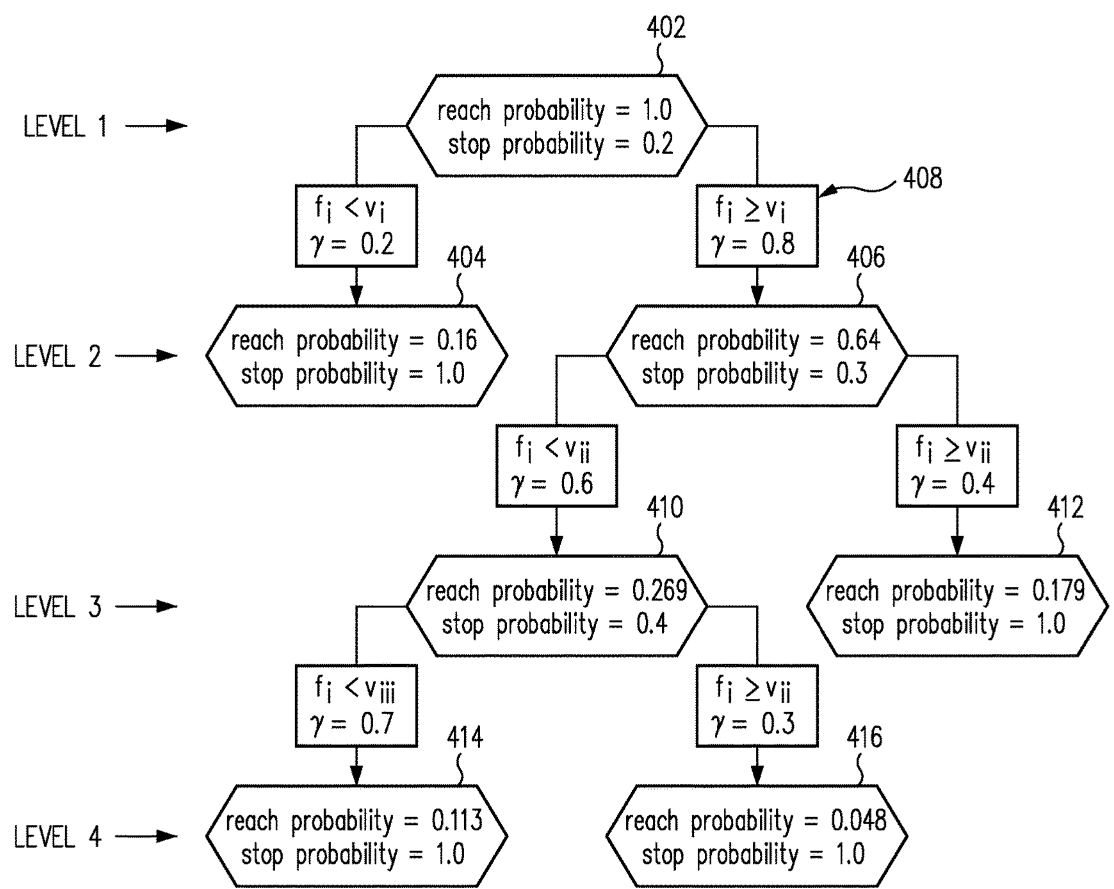
FIG. 4 is a diagram of an example of a tree diagram for defining at least part of a user experience analytics model, according to one embodiment.

At operation 304, the process performs data transformation, to prepare existing software system data 222 and data representing business metrics 225 for processing, according to one embodiment. The process performs data transformation on the existing software system data 222 (inclusive of user characteristics data and user responses), on user experience options 213, and on business metrics 225. Data transformation includes, but is not limited to, formatting, rearranging, organizing, ranking, and/or prioritizing the data to enable it to be uniformly processed or analyzed by one or more equations and/or algorithms, according to one embodiment. Operation 304 proceeds to operation 306, according to one embodiment At operation 306, the process performs bias removal via importance sampling weight calculation, according to one embodiment. The process performs bias removal on the business metrics, such as conversions and revenue, as well as on user responses for the existing software system data 222 to account for particular user characteristics that were targeted, that are different, or that otherwise bias the user responses and/or the business metrics, according to one embodiment. Operation 306 proceeds to operation 310, according to one embodiment At operation 310, the process performs user experience model training, according to one embodiment. The process uses the same algorithm to initialize and to update the user experience analytics model, according to one embodiment. The process trains the user experience analytics model by using techniques that include, but are not limited to, regression, logistic regression, decision trees, artificial neural networks, support vector machines, linear regression, nearest neighbor methods, distance based methods, Naive Bayes, linear discriminant analysis, k-nearest neighbor algorithm, and/or another mathematical, statistical, logical, or relational algorithms to determine correlations and/or other relationships between the user characteristics data and the performance of user experience options on segments of users, according to one embodiment. Operation 310 proceeds to operation 312, according to one embodiment In one embodiment, the process 300 performs user experience model training by creating, validating, and/or modifying a decision tree. FIG. 4 illustrates an example of a decision tree 400 that can be used to determine at least part of the algorithm, logic, and/or function of the user experience analytics model that selects which user experience options to deliver to users based on user characteristics, to facilitate providing personalized user experiences in the software system 211. The decision tree 400 includes nodes 402, 404, 406, 410, 412, 414, and 416 (collectively, nodes 402-416) connected together through edges and edge logic. The edge logic defines the rules and parameters for traversing from a parent node to a child node in the decision tree 400, according to one embodiment. Each of the nodes 402-416 includes node properties, such as a reach probability, a stop probability, a user experience option, and a user segment.

The reach probability is the probability that a person coming into the stream of the decision tree will reach a particular node, according to one embodiment. Because all users are evaluated by the node 402, the reach probability of the node 402 is 1, indicating that there is a 100% chance that a user's characteristics will be evaluated by the node 402. Node 404 has a reach probability of 0.16 and node 406 has a reach probability of 0.64. Accordingly, of all the user traffic that is applied to the decision tree 400, node 404 will receive 16% of the user traffic and node 406 will receive 64% of the user traffic, on average, according to one embodiment. Because each node is assigned at least one user experience option, and because the reach probabilities of the nodes 402-416 indicate the frequency with which a user experience option is provided to users of a user segment, the reach probabilities are the distribution frequency rates described in the production environment 200 (shown in FIG. 2). In other words, the reach probabilities determine a frequency rate by which to distribute user experience options to users of user segments, based on the users' characteristics, according to one embodiment.

The stop probability is the probability that the performance of a particular node without children nodes (for a user segment) will be better than the performance of children nodes split from the particular node, according to one embodiment. In other words, the stop probability is the probability that the performance of a leaf node is greater than the performance of creating two children nodes from a leaf node to convert the leaf node to a parent node. If a stop probability is 1, then the probability of stopping the further evaluation of the data sample is 100%. If a stop probability is less than 1, then the stop probability represents a likelihood that the decision tree will apply the user experience option of the current node rather than evaluating a further path through the nodes of the decision tree 400, according to one embodiment. In one embodiment, if a data sample does not receive the user experience option of a parent node, then the data sample receives the user experience option of a descendent node.

At least one user experience option is assigned to each node of the decision tree 400. In one embodiment, a user experience option is defined as omitting a user experience element (e.g., a button, a text box, a question, a webpage, etc.) from a user's personalized user experience. In one embodiment, a user experience option is defined as adding a user experience element or applying an analytics model, a sequence, or other user experience tool to a user's personalized user experience. In one embodiment, the user experience analytics model includes a different decision tree for each user experience option, so that each of the nodes in the decision tree represent a binary decision to apply or to not apply a user experience option to the user's personalized user experience. In one embodiment, the user experience analytics model includes a different decision tree for each user characteristic, and each of the nodes in the decision tree represent the application of one of a number of user experience options to a user's personalized user experience. In one embodiment, the user experience analytics model includes a decision tree having edge logic that evaluates different user characteristics and each node of the decision tree represent the application of one of a number of user experience options, and the node paths can include a variety user experience options (rather than a Boolean application of a single user experience option).

The user segment is a segment or portion of users who have at least one user characteristic in common. For example, a user set can be bifurcated into two user segments, in which a first user segment includes users who are younger than 30 years old and the second user segment includes users who are at least 30 years old, according to one embodiment.

Each of the nodes 402-416 belong to a level that is defined by 1 plus the number of connections between the node of interest and the root node. Because the root node is the top node in the decision tree 400, the root node for the decision tree 400 is the node 402. Accordingly, node 402 belongs to level 1, nodes 404 and 406 belong to level 2, nodes 410 and 412 belong to level 3, and nodes 414 and 416 belong to level 4 of the decision tree 400, according to one embodiment.

In one embodiment, the user experience option for a node is related to the level of the node in the decision tree 400. In one embodiment, all levels of one decision tree provide binary options for whether or not to apply a single user experience option to a user's personalized user experience. In one embodiment, each level of the decision tree is associated with a different user experience option, and each level of the decision tree provides binary options for whether or not to apply the user experience option associated with that level to a user's personalized user experience. In one embodiment, user experience options are allocated to nodes within the decision tree, based on the dominance or capacity of the user experience option to affect the actions of users, with more dominant user experience options being assigned to nodes that are closer to the root node.

In one embodiment, edge logic includes an edge frequency ($\gamma$) for which a single user characteristic ($f_i$) satisfies a threshold ($v_i$). The edge logic provides rules and the average frequency by which data samples traverse parent nodes to children nodes. The edge logic 408 indicates that the probability of the user characteristic ($f_i$) being greater than or equal to the threshold ($v_i$) is 0.8, and that the probability of the user characteristic ($f_i$) being less than the threshold ($v_i$) is 0.2, according to one embodiment. The reach probability of a child node is the product of the edge frequency ($\gamma$) multiplied with the stop probability subtracted from one. For example, the reach probability of node 406 is 0.64 which is equal to (1−stop probability of node 402)*($\gamma$=0.8). In one embodiment, the thresholds for descendent nodes are different than all ancestor nodes because each descendent node already satisfies or inherits all of the characteristics of the descendent node's ancestor nodes.

Returning to the process 300 of FIG. 3, at operation 312, the process loads the decision engine with the user experience analytics model, according to one embodiment. Operation 312 proceeds to operation 314, according to one embodiment.

At operation 314, an application interfaces with users, according to one embodiment. The application interfaces with users by providing the users with questions to acquire user responses and/or to acquire user characteristics, according to one embodiment. The application interfaces with users by collecting clickstream data, IP address information, location of the user, operating system used by the user, user computing device identifiers, and other user characteristics data, according to one embodiment. The application and the decision engine save business metrics, user characteristics data, and/or user responses as existing software system data 222, according to one embodiment. The term "application" is used interchangeably with the term "software system", according to one embodiment. Operation 314 concurrently proceeds to operation 304 to update the user experience analytics model, and proceeds to operation 316 to apply the user experience analytics model to information received from the users, according to one embodiment.

At operation 316, the decision engine 214 receives user characteristics data, according to one embodiment. Operation 316 proceeds to operation 318, according to one embodiment.

At operation 318, the decision engine 214 applies the user experience analytics model to the user characteristics data and to user experience options 213, according to one embodiment. The decision engine 214 applies the user experience analytics model to the user characteristics data and to the user experience options 213 to determine the distribution frequency rates for which a particular user experience option is to be distributed to users having one or more of the user characteristics received during operation 316, according to one embodiment. Operation 318 proceeds to operation 322, according to one embodiment.

At operation 322, the decision engine 214 selects a user experience option, according to one embodiment. The decision engine 214 selects a user experience option based on the distribution frequency rates generated by the user experience analytics model in response to receipt of user characteristics data that describe a user. The decision engine 214 generates a pseudo-random number that is weighted according to the distribution frequency rates generated by the user experience analytics model, according to one embodiment. For example, if the user experience analytics model generates distribution frequency rates of 0.8 for filling a user experience display with a background color of red and 0.2 for filling a user experience display with a background color of blue, then the decision engine 214 generates a binary number which will indicate selecting a blue background color 8 out of 10 times and will indicate selecting a red background color 2 out of 10 times, on average, according to one embodiment. Because computing systems typically generate "random" numbers using algorithms and clocks, a "random" number generated by a computing system is referred to as a "pseudo-random" number.

Figure 5:
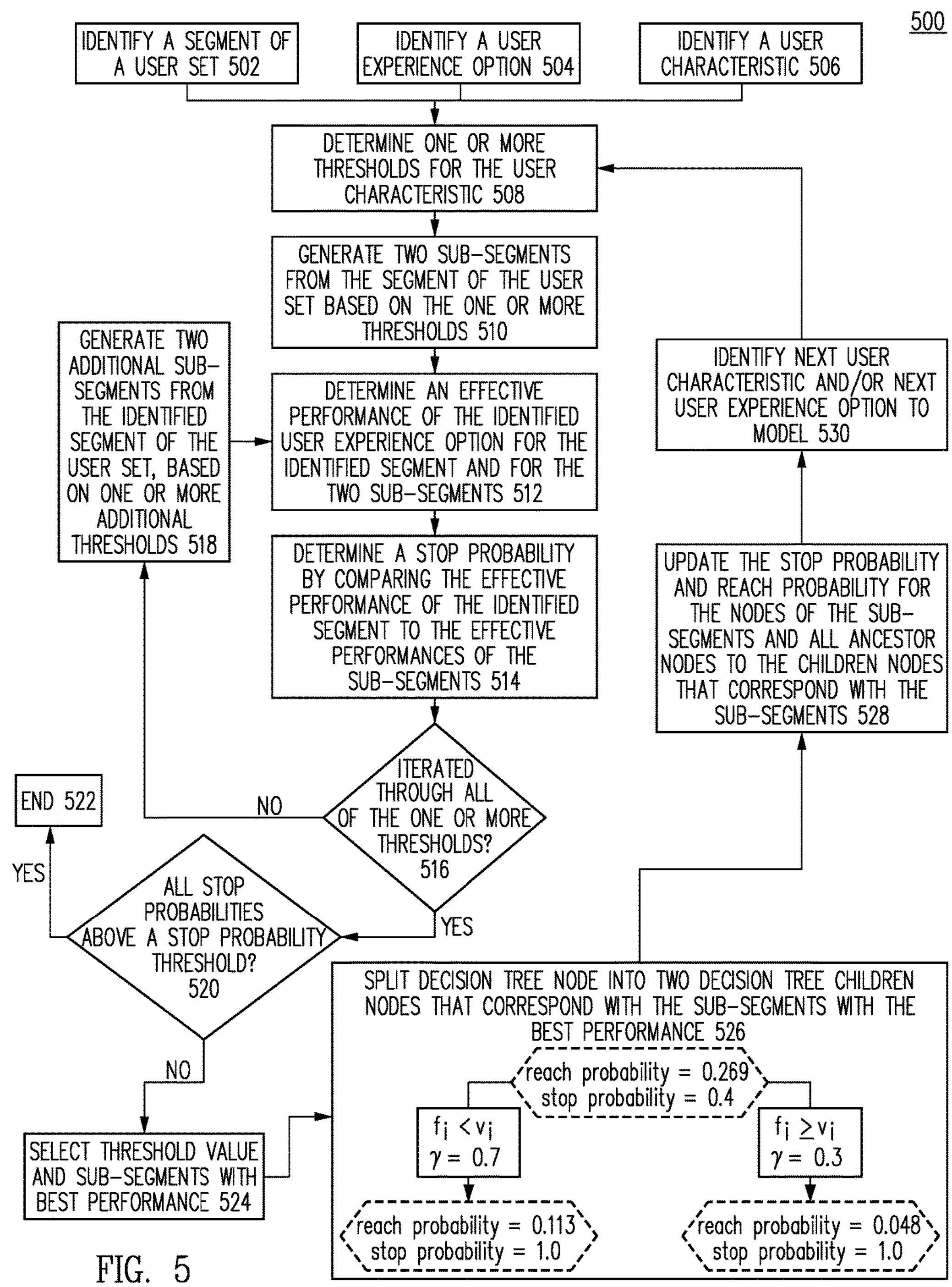
FIG. 5 is a flow diagram of an example of a process for defining a user experience analytics model, in accordance with one embodiment.

FIG. 5 illustrates an example of a process 500 that is employed or executed by the software system 211 of the production environment 200, to periodically update the user experience analytics model 219, according to one embodiment. By periodically updating the user experience analytics model and/or by defining/initializing the user experience analytics model 219, a software system (e.g., a tax return preparation system or other finance management system) can reap the benefits of deploying user experience options that are immediately effective on users (with a probabilistic certainty) while concurrently and adaptively testing user responses to other stimuli, e.g., other user experience options, to improve user satisfaction with the personalized user experience provided by the software system 211, according to one embodiment.

At operation 502 the process identifies a segment of a user set, according to one embodiment. The segment may be the entirety of the user set, may include recent users of the user set, may include users who have interacted with a software system over a predetermined period of time (e.g., 8 during a previous year), or may be any other subset of the user set, according to one embodiment. Operation 502 proceeds to operation 508, according to one embodiment.

At operation 504, the process identifies a user experience option, according to one embodiment. The user experience option identified by the process is used by the process to define nodes, node properties, and edge logic for traversing from parent nodes to children nodes, according to one embodiment. In one embodiment, identifying a user experience option includes identifying a plurality of user experience options, according to one embodiment. In one embodiment, operation 504 occurs prior to operation 502, after operation 502, or concurrently with operation 502, according to one embodiment. Operation 504 proceeds to operation 508, according to one embodiment.

At operation 506, the process identifies a user characteristic, according to one embodiment. As described above, user characteristics can include personal identification information, income information, tax-related information, clickstream information, geographic location of the user, an IP address or other computing or other user computing device identification information, family information about the user, and the like, according to various embodiments. The process performs operation 506 before, in between, after, or concurrently with operation 502 and/or operation 504, according to one embodiment. Operation 506 proceeds to operation 508, according to one embodiment.

At operation 508, the process determines one or more thresholds for the user characteristic, according to one embodiment. By determining the one or more thresholds, the process is able to define additional segments of users, to determine if the identified user experience option more effectively causes one segment of users to perform a particular action better than another segment of users, according to one embodiment. In other words, a threshold value such as 35 years of age, for a user characteristic of age, can be used to bifurcate a segment of users of all ages into to a sub-segment of users who are less than 35 years old and a sub-segment of users who are at least 35 years old, according to one embodiment. Operation 508 proceeds to operation 510, according to one embodiment.

At operation 510, the process generates two sub-segments from the segment of the user set, based on the one or more thresholds, according to one embodiment. The operation 510 proceeds to operation 512, according to one embodiment.

At operation 512, the process determines an effective performance of the identified user experience option for the identified segment and for the two sub-segments, according to one embodiment. The effective performance of the user experience option for the identified segment and/or for the two sub-segments is a probabilistic distribution that users (who are defined by the segments and/or sub-segments) will perform one or more predetermined actions, according to one embodiment. Examples of the determined actions include, but are not limited to, answering questions, remaining logged into a user session of the software system, filing a tax return, progressing through a sequence of topics or a sequence of questions, clicking a button, interacting with a particular user experience object or element, paying for a service, submitting credit card information, providing an email address, providing a telephone number, and the like, according to various embodiments. In one embodiment, the process uses Thompson Sampling on user responses to user experience options, at least partially based on user characteristics data, to determine a sample mean and a sample variance for the performance of user experience options on a segment of users, according to one embodiment. In one embodiment, the process uses Thompson Sampling blending or other mathematical techniques for calculating an average of multiple Thompson Samples to determine an effective performance of a user experience option on a segment or sub-segment, according to one embodiment. Operation 512 proceeds to operation 514, according to one embodiment.

At operation 514, the process determines a stop probability by comparing the effective performance of the identified segment to the effective performances of the two sub-segments of the identified segment, according to one embodiment. The stop probability is the probability that the performance of the identified segment is greater than the effective performance of the two sub-segments, according to one embodiment. In terms of nodes in a decision tree, the stop probability is the probability that the effective performance of a user experience option that is associated with a parent node is greater than an effective performance of user experience options that are associated with children nodes, according to one embodiment. A low stop probability indicates that the likelihood of gaining additional effective performance from the user experience analytics model will likely be gained from splitting an identified segment into two sub-segments, according to one embodiment. Operation 514 proceeds to operation 516, according to one embodiment.

At operation 516, the process determines if the process has iterated through all identified thresholds, according to one embodiment. For user characteristics having binary or Boolean outcomes such as yes or no, there may not be multiple thresholds to iterate through. However, if the user characteristics that are used to define part of the model have continuous values, e.g., users' ages, user income, and the like, then the process advantageously identifies and recurses through the multiple thresholds (e.g., through multiple age ranges or income ranges) to test the effective performance of a user experience option against variations of sub-segments, according to one embodiment. If the process completes iterating through all of the one or more thresholds, operation 516 proceeds to operation 520, according to one embodiment. If the process has not iterated through all of the one or more thresholds, operation 516 proceeds to operation 518, according to one embodiment.

At operation 518, the process generates two additional sub-segments from the identified segment of the user set, based on one or more additional thresholds, according to one embodiment. Operation 518 proceeds to operation 512, according to one embodiment.

At operation 520, the process determines if all stop probabilities are above a stop probability threshold, according to one embodiment. If all stop probabilities are above a stop probability threshold, e.g., 0.8, the operation 520 proceeds to operation 522 to end the process, according to one embodiment. If at least one of the stop probabilities is not above the stop probability threshold, operation 520 proceeds to operation 524.

At operation 524, the process selects a threshold value and the sub-segments with the best performance, according to one embodiment. The effective performance of segments and sub-segments is a probabilistic distribution having a sample mean and a sample variance. In one embodiment, the best performance includes a combination of a threshold and a user experience option that results in the highest sample mean. In one embodiment, the best performance includes a combination of a threshold and a user experience option that produces the lowest sample variance. In one embodiment, the best performance includes a combination of a threshold and a user experience option that produces the highest sample mean and/or the lowest sample variance while having a sample mean that is greater than a minimum threshold and/or while having a sample variance that is below a maximum sample variance threshold. Operation 524 proceeds to operation 526, according to one embodiment.

At operation 526, the process splits a decision tree node into two decision tree children nodes that correspond with the sub-segments with the best performance, according to one embodiment. When creating children nodes, the node properties (e.g., the reach probabilities, stop probabilities, user experience options, etc.) are defined for the children nodes and the node properties for the parent node of the split are also updated. Operation 526 proceeds to operation 528, according to one embodiment.

At operation 528, the process updates the stop probability and the reach probability for the nodes of the sub-segments and all ancestor nodes to the children nodes that correspond with the sub-segments, according to one embodiment. For example, because the sum of the reach probabilities for the nodes of the decision tree is 1, the reach probabilities of ancestor nodes are updated to reflect the addition of the children node reach probabilities, according to one embodiment. Operation 528 proceeds to operation 530, according to one embodiment.

At operation 530, the process identifies a next user characteristic and/or a next user experience option to model, according to one embodiment. Operation 530 proceeds to operation 508, according to one embodiment.

Figure 6:
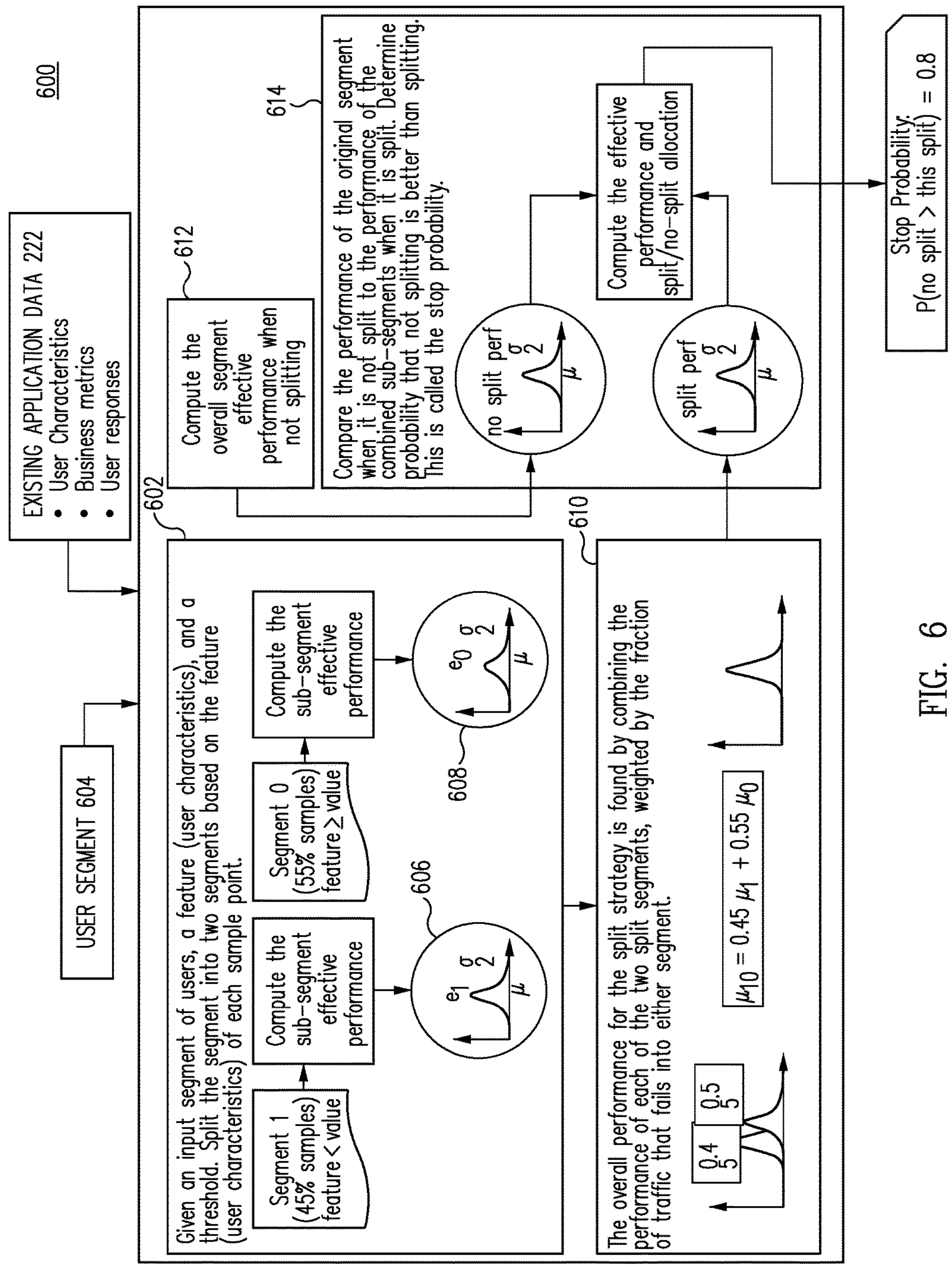
FIG. 6 is a flow diagram of an example of a process for determining a stop probability, in accordance with one embodiment.

FIG. 6 illustrates an example of a flow diagram for a process 600 for determining a stop probability, according to one embodiment. The process 600 is an example of one technique for determining a stop probability that can be performed during operation 514 of FIG. 5 of the process 500 for defining a user experience analytics model, according to one embodiment.

At block 602, the process splits a user segment 604 into two sub-segments, and determines the effective performance of each sub-segment based on existing software system data 222, according to one embodiment. The existing software system data includes, but is not limited to, user characteristics data, user responses, conversion rates of users to paying customers, revenue generated by the software system, and the like, according to one embodiment. The sub-segments are splits based on a value of the threshold and based on whether a user characteristic is less than the value or greater than or equal to the value of the threshold, according to one embodiment. The result of determining the effective performance of each sub-segment is a probabilistic distribution 606 and a probabilistic distribution 608 for the sub-segments, according to one embodiment. The probabilistic distributions 606 and 608 are not just an estimate of the performance of a user experience option on each sub-segment, instead, the probabilistic distributions 606 and 608 are estimations of the probability of the performance of a user experience option on the sub-segments. The effective performances result in probabilistic distributions because the effective performances are estimates of performance that include the uncertainty around how a user will respond to a user experience option integrated into the user's personalized user experience, according to one embodiment. The process proceeds from block 602 to block 610, according to one embodiment.

At block 610, the process determines/computes the combined effective performance of the effective performance of the two sub-segments, according to one embodiment. The process determines the combined effective performance by using addition or other mathematical operations to combine the performance of each sub-segment, with each sub-segment effective performance weighted by the edge frequency (γ) (fraction of parent node traffic from FIG. 4), to remove bias, in one embodiment. The process proceeds from block 610 to block 614, according to one embodiment.

At block 612, the process determines/computes the effective performance of the segment as though the sub-segments were not being split from the segment, according to one embodiment. In other words, the process computes the overall segment effective performance assuming the segment is not being split. The process proceeds from block 612 to block 614, according to one embodiment.

At block 614, the process compares the effective performance of the segment, when it is not split, to the combined effective performance of the sub-sections, to determine the stop probability, according to one embodiment. The stop probability is the probability that the effective performance of the un-split segment is greater or better than the effective performance of splitting the segment, according to one embodiment.

Figure 7:
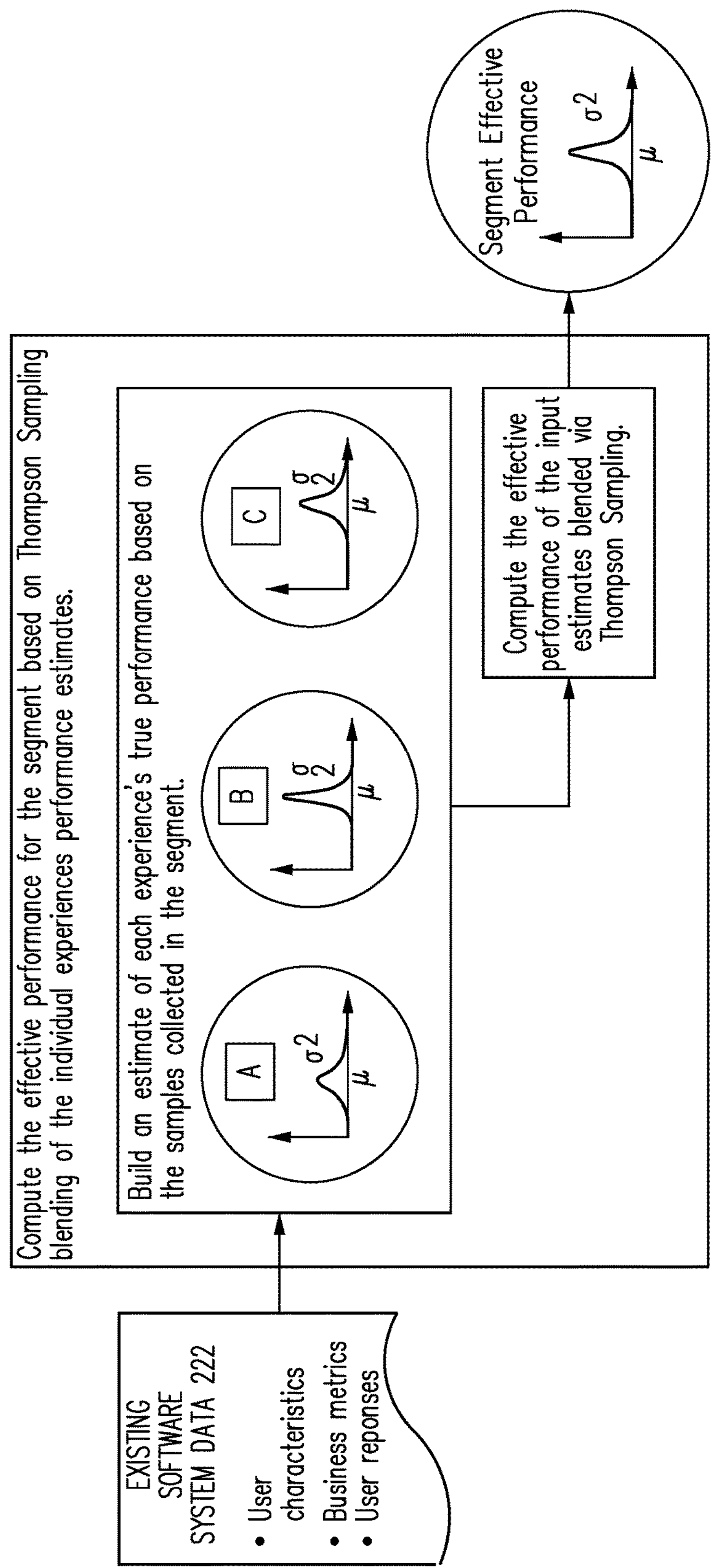
FIG. 7 is a flow diagram of an example of a process for computing the effective performance of a segment or sub-segment of users, in accordance with one embodiment.

FIG. 7 illustrates an example of a flow diagram of a process 700 for computing the effective performance of a segment or sub-segment of users, according to one embodiment. The process 700 is an example of one technique that can be used by operation 512 (shown in FIG. 5) for the process 500 for defining a user experience analytics model, according to one embodiment. The process 700 is an example of one technique that can be used in blocks 602 and/or 612 (shown in FIG. 6) for the process 600 for determining a stop probability, according to one embodiment.

The process 700 uses existing software system data 222 to compute the effective performance for a segment based on Thompson Sampling blending of the performance of individual user experience options and/or based on each individual user's experience/feedback with the software system (e.g., in response to receiving the user experience option in the user's personalized user experience), according to one embodiment.

FIG. 8 illustrates an example flow diagram for a process 800 for computing the effective performance of input estimates blended by Thompson Sampling, according to one embodiment. The process 800 is an example of one technique that can be used in block 614 (show in FIG. 6) of the process 600 for determining a stop probability, according to one embodiment. The process 800 is an example of one technique that can be used during the process 700 for computing the effective performance of a segment or subsegment, according to one embodiment.

The process 800 uses the probability density function ("PDF") and the cumulative distribution function ("CDF") to determine the probability that the true performance of each user's experience or of each user experience option is better than alternative options, according to one embodiment. As illustrated in FIG. 8, the process 800 computes the effective performance of an entire segment of users as a weighted combination of either each user's experience or of the distribution of a particular user experience option to the users of the segment of users, in one embodiment.

Figure 9:
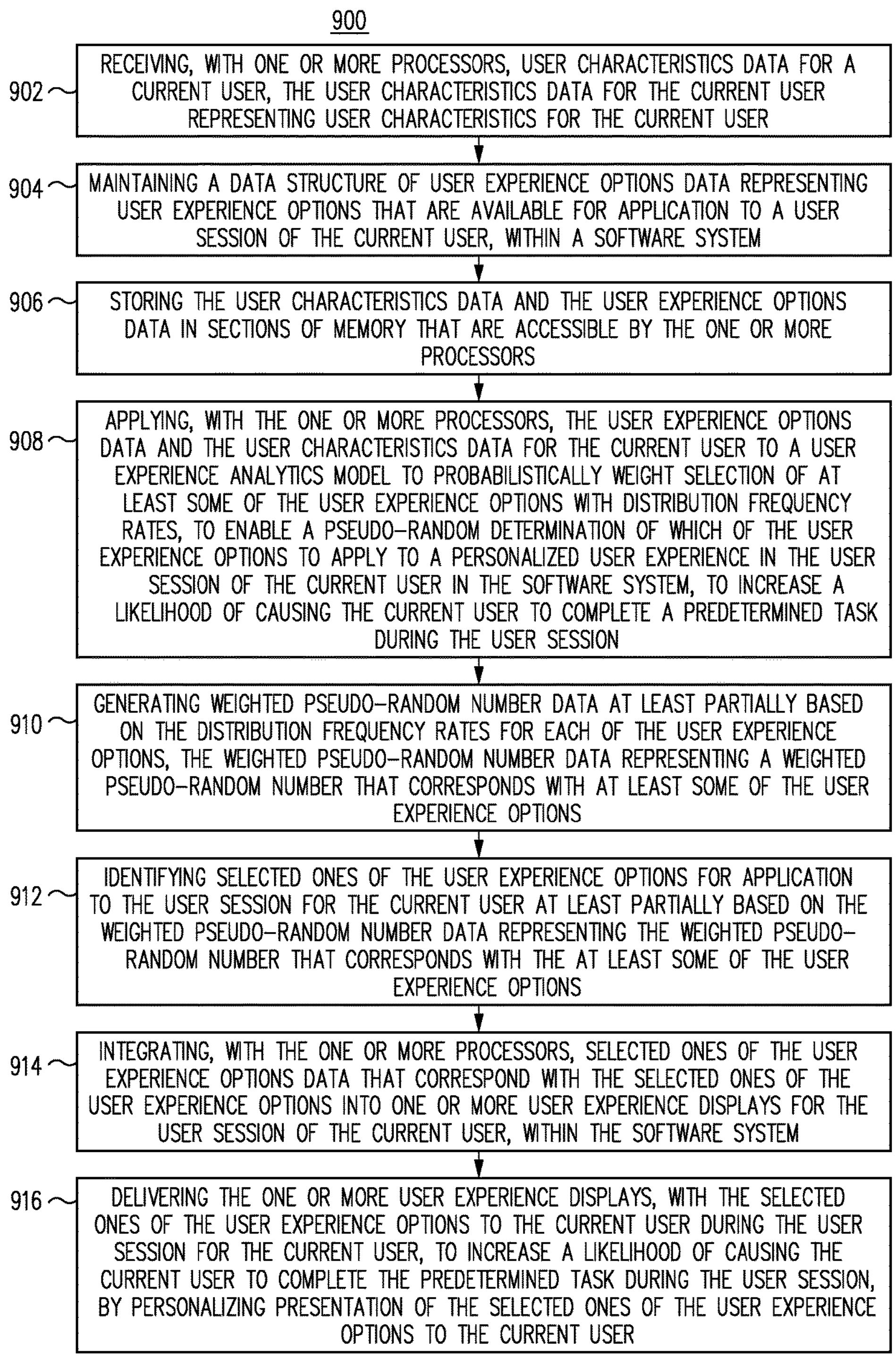
FIG. 9 is a flow diagram of an example of a process for providing personalized user experiences in a software system, according to one embodiment Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

FIG. 9 illustrates an example flow diagram of a process 900 for providing personalized user experiences in a software system, according to one embodiment.

At operation 902, the process includes receiving, with one or more processors, user characteristics data for a current user, the user characteristics data for the current user representing user characteristics for the current user, according to one embodiment.

At operation 904, the process includes maintaining a data structure of user experience options data representing user experience options that are available for application to a user session of the current user, within a software system, according to one embodiment.

At operation 906, the process includes storing the user characteristics data and the user experience options data in sections of memory that are accessible by the one or more processors, according to one embodiment.

At operation 908, the process includes applying, with the one or more processors, the user experience options data and the user characteristics data for the current user to a user experience analytics model to probabilistically weight selection of at least some of the user experience options with distribution frequency rates, to enable a pseudo-random determination of which of the user experience options to apply to a personalized user experience in the user session of the current user in the software system, to increase a likelihood of causing the current user to complete a predetermined task during the user session, according to one embodiment.

At operation 910, the process includes generating weighted pseudo-random number data at least partially based on the distribution frequency rates for each of the user experience options, the weighted pseudo-random number data representing a weighted pseudo-random number that corresponds with at least some of the user experience options, according to one embodiment.

At operation 912, the process includes identifying selected ones of the user experience options for application to the user session for the current user at least partially based on the weighted pseudo-random number data representing the weighted pseudo-random number that corresponds with the at least some of the user experience options, according to one embodiment.

At operation 914, the process includes integrating, with the one or more processors, selected ones of the user experience options data that correspond with the selected ones of the user experience options into one or more user experience displays for the user session of the current user, within the software system, according to one embodiment.

At operation 916, the process includes delivering the one or more user experience displays, with the selected ones of the user experience options, to the current user during the user session for the current user, to increase a likelihood of causing the current user to complete the predetermined task during the user session, by personalizing presentation of the selected ones of the user experience options to the current user, according to one embodiment.

Embodiments of the present disclosure address some of the shortcomings associated with traditional tax return preparation systems and other software systems by providing personalized user experiences in a software system, to provide personalized user experience options to some users while concurrently testing the user responses of other users to other user experience options, according to one embodiment. The disclosed software system selects the user experience options by applying user characteristics data to a user experience analytics model, according to one embodiment. The software system analyzes user responses to the user experience options to update the analytics model and to adapt the personalization of the user experience options at least partially based on feedback from users, according to one embodiment.

Embodiments of the disclosed software system provides superior testing results over traditional A/B testing, while seamlessly integrating feedback from the A/B testing into the software system. Traditional A/B testing is inefficient. For example, traditional A/B testing allocates control conditions to 50% of a set of users as a control group and allocates experimental conditions to 50% of the set of users as an experimental group, without regard to the likelihood of satisfactory performance of the control conditions over the test conditions or vice versa. The test conditions are typically stuck, until a critical confidence, e.g., 95% confidence, is reached. By contrast, the disclosed system dynamically allocates control conditions and test conditions concurrently to enable the software system to both test new user experience options while providing users with personalized user experiences that they are probabilistically likely to respond well to. As a result, more users of the software system are likely to be satisfied with the software system and are more likely to complete a predetermined/desired action (e.g., completing questions, visiting a sequence of web pages, file a tax return, etc.) because the users receive user experience options sooner than the same users would with the implementation of traditional A/B testing techniques. The improvements in customer satisfaction and the increases in customers completing predetermined actions in the software system results in increased conversions of potential customers to paying customers, which translates to increased revenue for service providers, according to one embodiment.

By providing personalized user experiences in software systems, such as tax return preparation systems, implementation of embodiments of the present disclosure allows for significant improvement to the fields of user experience, electronic tax return preparation, data collection, and data processing, according to one embodiment. As one illustrative example, by adaptively distributing user experience options to users based on user characteristics and based on distributive frequency rates, embodiments of the present disclosure allows for progressing a user through software system user flows and/or tax return preparation sessions with fewer processing cycles and less communications bandwidth because the user is less likely to prematurely terminate his/her user session prior to completing a particular activity (e.g., filing a tax return). This reduces processing cycles and communications bandwidth because the user, after termination of his session, does not then go to a competing tax return preparation system and/or software system to redundantly perform the same tasks. In other words, improving customer satisfaction, by personalizing the user experiences, reduces global energy consumption by reducing redundant efforts and inefficiencies associated therewith. As a result, embodiments of the present disclosure allow for improved processor performance, more efficient use of memory access and data storage capabilities, reduced communication channel bandwidth utilization, and therefore faster communications connections.

In addition to improving overall computing performance, by dynamically and adaptively providing personalized user experiences in software systems, implementation of embodiments of the present disclosure represent a significant improvement to the field automated user experiences and, in particular, efficient use of human and non-human resources. As one illustrative example, by increasing personal preferences for user experience options and by reducing presentation of non-preferred/less-effective user experience options, the user can more easily comprehend and interact with digital user experience displays and computing environments, reducing the overall time invested by the user to the tax return preparation or other software system-related tasks. Additionally, selectively presenting user experience options to users, based on their user characteristics, improves and/or increases the likelihood that a potential customer will be converted into a paying customer because the potential customer receives confirmation that the software system appears to understand the particular user's needs and preferences, according to one embodiment. Consequently, using embodiments of the present disclosure, the user experience is less burdensome, less time consuming and allows the user to dedicate more of his or her time to other activities or endeavors, while having confidence that the tax return preparation system and/or software system is adequately addressing the needs of the user.

In accordance with an embodiment, a computer system implemented method provides adaptive experiences in a software application. The method includes receiving, with one or more processors, user characteristics data for a current user, the user characteristics data for the current user representing user characteristics for the current user, according to one embodiment. The method includes maintaining a data structure of user experience options data representing user experience options that are available for use in a user session of the current user, within a software application, according to one embodiment. The method includes storing the user characteristics data and the user experience options data in sections of memory that are accessible by the one or more processors, according to one embodiment. The method includes applying, with the one or more processors, the user experience options data and the user characteristics data for the current user to a user experience analytics model to probabilistically weight at least some of the user experience options at least partially based on distribution frequency rates, to pseudo-randomly determine which of the user experience options to apply to a user experience for the current user in the software application, to increase a likelihood of causing a predetermined user response by the current user during the user session within the software application, according to one embodiment. The method includes generating weighted pseudo-random number data at least partially based on the distribution frequency rates for each of the user experience options, the weighted pseudo-random number data representing a weighted pseudo-random number that corresponds with at least some of the user experience options, according to one embodiment. The method includes identifying selected ones of the user experience options for application to the user session for the current user at least partially based on the weighted pseudo-random number data representing the weighted pseudo-random number that corresponds with the at least some of the user experience options, according to one embodiment. The method includes integrating, with the one or more processors, selected ones of the user experience options data that correspond with the selected ones of the user experience options into one or more user experience displays for the user session of the current user, within the software application, according to one embodiment. The method includes delivering the one or more user experience displays, with the selected ones of the user experience options, to the current user during the user session for the current user, to increase a likelihood of causing the predetermined user response by the current user during the user session within the software application, by personalizing delivery of the selected ones of the user experience options for the current user, according to one embodiment.

In accordance with an embodiment, a computer system implemented method personalizes a user experience in a software application. The method includes training a user experience analytics model, according to one embodiment. Training the user experience analytics model includes retrieving, with one or more processors, a plurality of existing user characteristics data for a plurality of existing users of a software application that provided services to the plurality of existing users, the plurality of existing user characteristics data representing a plurality of existing user characteristics for the plurality of users, according to one embodiment. Training the user experience analytics model includes identifying user experience option data representing a user experience option for the software, the user experience option being applicable to current user experiences to modify the current user experiences to improve a likelihood of causing particular user responses in the software by at least some of a plurality of current users of the software, according to one embodiment. Training the user experience analytics model includes analyzing, with the one or more processors, the plurality of user characteristics data and the user experience option data to generate a decision tree that determines distribution frequency rates for applying the user experience option to segments of the plurality of current users in the software, each of the segments of the plurality of the current users being associated with a subset of a plurality of current user characteristics for the plurality of current users, according to one embodiment.

Analyzing the plurality of user characteristics data and the user experience data includes determining performance scores data for the user experience option representing performance scores for the user experience option, the performance scores representing probabilistic effects of applying the user experience option to existing user experiences in the software for the segments of the plurality of existing users, according to one embodiment. Analyzing the plurality of user characteristics data and the user experience data includes comparing the performance scores data for a first segment of the plurality of existing users to the performance scores data of a second segment and of a third segment of the plurality of existing users, the first segment of the plurality of existing users representing a combination of the second segment and the third segment of the plurality of existing users, according to one embodiment. Analyzing the plurality of user characteristics data and the user experience data includes, if a combination of the performance scores data of the second segment and of the third segment of the plurality of existing users represent combined performance scores that are better than performance scores represented by the performance scores data of the first segment of the plurality of existing users, splitting a first node in the decision tree representing the first segment of the plurality of existing users into a second node and a third node in the decision tree, the second node representing the second segment of the plurality of existing users and the third node representing the third segment of existing users, first node having a first distribution frequency rate, the second node having a second distribution frequency rate, the third node having a third distribution frequency rate, the second node being associated with a first version of the user experience option, the third node being associated with a second version of the user experience option, according to one embodiment.

The computer system implemented method of personalizing a user experience in a software application includes applying current user characteristics data representing current user characteristics of a plurality of current users to the user experience analytics model to cause the particular user responses in the software to improve the current user experiences for the plurality of current users of the software by allocating a first segment of the plurality of current users to the second node of the decision tree in accordance with the second distribution frequency rate to apply the first version of the user experience option to the user experiences of the first segment of the plurality of current users, and by allocating a second segment of the plurality of current users to the third node in the decision tree in accordance with the third distribution frequency rate to apply the second version of the user experience option to the user experiences of the second segment of the plurality of current users, according to one embodiment.

In accordance with an embodiment, a system provides personalized user experiences. The system includes a memory that stores information of users of a software system, according to one embodiment. The system includes one or more processors communicatively coupled to the memory to perform operations on the information of users of the software system, according to one embodiment. The system includes a system engine that receives, with the one or more processors, user characteristics data and user responses data from a plurality of users, wherein the system engine stores the user characteristics data and the user responses data in the memory, according to one embodiment. The system includes a decision engine that receives, with the one or more processors, the user characteristics data from the memory and applies the user characteristics data to a user experience analytics model to determine which of a plurality of user experience options to provide to users having user characteristics that are represented by the user characteristics data, the user experience analytics model being configured to identify selected ones of the plurality of user experience options at least partially based on user characteristics data, the selected ones of the plurality of user experience options being probabilistically likely to cause the users to perform a particular task, according to one embodiment. The system engine is configured to integrate the selected ones of the plurality of user experience options into user experience displays, and to host the user experience displays to provide personalized user experiences to the users at least partially based on the user characteristics of the users to increase a likelihood that the users perform a particular task during user sessions with the software system, according to one embodiment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computer system implemented method for personalizing a user experience in a software system, comprising:

training a user experience analytics model, including:

retrieving, with one or more processors, a plurality of existing user characteristics data for a plurality of existing users of a software system that provided services to the plurality of existing users, the plurality of existing user characteristics data representing a plurality of existing user characteristics for the plurality of existing users wherein the user characteristics include data representing user computing system characteristics, data identifying an external referrer of the user, and data indicating a number of visits made to a service provider website;

identifying user experience option data representing user experience options for the software, the user experience options being applicable to current user experiences in the software system to modify the current user experiences to improve a likelihood of causing particular user responses in the software system by at least some of a plurality of current users of the software, the user experience options including at least one user experience option adding a user experience element to a personalized user experience and further including at least one user experience option omitting a user experience element from a personalized user experience; and analyzing, with the one or more processors, the plurality of existing user characteristics data and the user experience option data to generate a decision tree having individual nodes associated with individual distribution frequency rates for applying the user experience option to segments of the plurality of current users in the software, each node of the decision tree representing a different user experience option, wherein if a user experience option of a parent node of the decision tree is not provided to the personalized user experience, a user experience option of a descendent node is provided instead, each of the segments of the plurality of the current users being associated with a subset of a plurality of current user characteristics for the plurality of current users, wherein analyzing the plurality of existing user characteristics data and the user experience option data includes:

determining performance scores data for the user experience option representing performance scores for the user experience option, the performance scores representing probabilities of causing the particular user responses by applying the user experience option to existing user experiences in the software system for the segments of the plurality of existing users;

comparing the performance scores data for a first segment of the plurality of existing users to the performance scores data of a second segment and to the performance scores data of a third segment of the plurality of existing users, the first segment of the plurality of existing users representing a combination of the second segment and the third segment of the plurality of existing users;

determining stop probabilities for nodes of the decision tree, each of the stop probabilities being distribution frequency rates representing a likelihood that applying a user experience option associated with a parent node of the decision tree generates better user responses than applying user experience options associated with descendent nodes of the parent node, wherein determining the stop probabilities for the nodes includes:

determining the likelihood that applying a user experience option associated with a parent node of the decision tree generates better user responses than applying user experience options associated with descendent nodes of the parent node, by:

for the parent node, using distributions derived from existing user data samples of user responses for the user experience option associated with the parent node to estimate a parent node true performance of the user experience option associated with the parent;

for a first of the descendent nodes, using distributions derived from a first segmented portion of the existing user data samples of user responses for a first of the user experience options associated with the descendent nodes of the parent node to estimate a first descendent node true performance of the first of the user experience options associated with the descendent nodes;

for a second of the descendent nodes, using distributions derived from a second segmented portion of the existing user data samples of user responses for a second of the user experience options associated with the descendent nodes of the parent node to estimate a second descendent node true performance of the second of the user experience options associated with the descendent nodes;

calculating a combined descendent nodes true performance by combining the first descendent node true performance with the second descendent node true performance; and determining one of the stop probabilities as a probability of the parent node true performance being greater than the combined descendent nodes true performance;

and upon a determination that a combination of the performance scores data of the second segment and of the third segment of the plurality of existing users represent combined performance scores that are better than performance scores represented by the performance scores data of the first segment of the plurality of existing users, splitting a first node in the decision tree representing the first segment of the plurality of existing users into a second node and a third node in the decision tree, the second node representing the second segment of the plurality of existing users and the third node representing the third segment of the plurality of existing users, first node having a first distribution frequency rate, the second node having a second distribution frequency rate, the third node having a third distribution frequency rate, the second node being associated with a first version of the user experience option, the third node being associated with a second version of the user experience option; and applying current user characteristics data representing current user characteristics of the plurality of current users to the user experience analytics model to cause the particular user responses by the plurality of current users, and to improve the current user experiences for the plurality of current users, by allocating a first segment of the plurality of current users to the second node of the decision tree in accordance with the second distribution frequency rate to apply the first version of the user experience option to the user experiences of the first segment of the plurality of current users, and by allocating a second segment of the plurality of current users to the third node in the decision tree in accordance with the third distribution frequency rate to apply the second version of the user experience option to the user experiences of the second segment of the plurality of current users.

2. The computer system implemented method of claim 1, further comprising:

receiving the current user characteristics data from the plurality of current users of the software system, the current user characteristics data representing current user characteristics for the plurality of current users of the software system;

receiving current user responses data for the plurality of current users of the software system, the current user responses data representing current user responses to receiving the first version of the user experience option or the second version of the user experience option;

storing, in memory, the current user characteristics data for the plurality of current users and the current user responses data for the plurality of current users; and updating, with the one or more processors, the user experience analytics model, at least partially based on the current user characteristics data for the plurality of current users and at least partially based on the current user responses data for the plurality of current users.

3. The computer system implemented method of claim 1, further comprising:

integrating the first version of the user experience option or the second version of the user experience option into a user experience display; and providing the user experience display to a current user during a user session with the software system.

4. The computer system implemented method of claim 1, wherein the decision tree includes a plurality of nodes, and each of the plurality of nodes is associated with a one of a plurality of user experience options.

5. The computer system implemented method of claim 1, further comprising:

generating the descendent nodes of the parent node, if a stop probability for the parent node is below a predetermined threshold.

6. The computer system implemented method of claim 5, further comprising:

updating the stop probabilities for ancestor nodes of the descendent nodes for the parent node, in response to generating the descendent nodes for the parent node.

7. The computer system implemented method of claim 1, wherein the particular user responses are selected from a group of user responses consisting of: completing a sequence of questions; paying for a product within the software system; completing a tax return preparation; filing a tax return from within the software system; entering personal information; entering credit card information into the software system; and using the software system for longer than a predetermined period of time.

* * * * *